(12) United States Patent
Zhang et al.

(10) Patent No.: US 10,885,608 B2
(45) Date of Patent: Jan. 5, 2021

(54) SUPER-RESOLUTION WITH REFERENCE IMAGES

(71) Applicant: Adobe Inc., San Jose, CA (US)

(72) Inventors: Zhifei Zhang, Knoxville, TN (US);
Zhe Lin, Fremont, CA (US); Zhaowen Wang, San Jose, CA (US)

(73) Assignee: Adobe Inc., San Jose, CA (US)

( * ) Notice: Subject to any disclaimer, the term of this patent is extended or adjusted under 35 U.S.C. 154(b) by 280 days.

(21) Appl. No.: 16/001,656

(22) Filed: Jun. 6, 2018

(65) Prior Publication Data

US 2019/0378242 A1 Dec. 12, 2019

(51) Int. Cl.
| | | |
|---|---|---|
| *G06K 9/00* | (2006.01) | |
| *G06T 3/40* | (2006.01) | |
| *G06K 9/62* | (2006.01) | |
| *G06T 11/00* | (2006.01) | |

(52) U.S. Cl.
CPC .......... *G06T 3/4053* (2013.01); *G06K 9/6215* (2013.01); *G06T 3/4046* (2013.01); *G06T 11/001* (2013.01); *G06T 2200/24* (2013.01)

(58) Field of Classification Search
CPC ... G06T 3/4053; G06T 3/4046; G06T 11/001; G06T 2200/24; G06K 9/6215
See application file for complete search history.

(56) References Cited

U.S. PATENT DOCUMENTS

| | | | | |
|---|---|---|---|---|
| 7,379,611 | B2* | 5/2008 | Sun | G06T 3/4007 382/254 |
| 8,645,999 | B2* | 2/2014 | Lee | H04N 7/17318 725/38 |
| 9,547,887 | B2* | 1/2017 | Liang | G06K 9/6267 |
| 9,865,036 | B1* | 1/2018 | Liu | G06T 3/4053 |
| 9,875,523 | B2* | 1/2018 | Toyoda | G06T 3/4053 |
| 10,499,069 | B2* | 12/2019 | Wang | H04N 19/177 |
| 2014/0177706 | A1* | 6/2014 | Fernandes | G06T 3/4053 375/240.03 |

(Continued)

OTHER PUBLICATIONS

Chen, "Fast Patch-based Style Transfer of Arbitrary Style", Dec. 13, 2016, 10 pages.

(Continued)

*Primary Examiner* — Gregory M Desire
(74) *Attorney, Agent, or Firm* — SBMC

(57) ABSTRACT

In implementations of super-resolution with reference images, a super-resolution image is generated based on reference images. Reference images are not constrained to have same or similar content as a low-resolution image being super-resolved. Texture features indicating high-frequency content are extracted into texture feature maps, and patches of texture feature maps of reference images are determined based on texture feature similarity. A content feature map indicating low-frequency content of an image is adaptively fused with a swapped texture feature map including patches of reference images with a neural network based on similarity of texture features. A user interfaces allows a user to select regions of multiple reference images to use for super-resolution. Hence, a super-resolution image can be generated with rich texture details incorporated from multiple reference images, even in the absence of reference images having similar content to an image being upscaled.

20 Claims, 11 Drawing Sheets

(56) References Cited

U.S. PATENT DOCUMENTS

| | | | | |
|---|---|---|---|---|
| 2016/0191940 A1* | 6/2016 | Wang | ............... | H04N 19/80 |
| | | | | 375/240.16 |
| 2016/0267349 A1* | 9/2016 | Shoaib | ............... | G06F 16/51 |
| 2019/0378242 A1* | 12/2019 | Zhang | ............... | G06T 3/4061 |
| 2020/0257962 A1* | 8/2020 | Deng | ............... | G06N 3/084 |

OTHER PUBLICATIONS

Ledig,"Photo-Realistic Single Image Super-Resolution Using a Generative Adversarial Network", May 25, 2017, 19 pages.

* cited by examiner

SUPER-RESOLUTION WITH REFERENCE IMAGES

BACKGROUND

Super-resolution is the process of recovering a high-resolution (HR) image from a corresponding low-resolution (LR) image. Because a LR image lacks texture features (e.g., high-frequency details such as fur, hair, eyelashes, patterns, small items, and the like), super-resolution methods recover lost pixels of texture features, such as by interpolation or constraining neighborhood similarity. However, though these super-resolution methods may enhance edges, such as an edge of a building in an image, these methods tend to blur high-frequency texture features.

Some super-resolution methods fill in missing pixels of a LR image from images constrained to have similar or same content as the LR image, such as by searching a database of images with a query constraining the content of the images returned by the database to be similar or the same as content of the LR image. For instance, some super-resolution methods may rely on other frames of a video sequence to upscale a frame of the video sequence. However, these super-resolution methods suffer from a lack of perceptually sharp and realistic texture features because the high-frequency content of texture features is too detailed to be captured simply by content constrained to be similar or the same as content of the LR image.

Moreover, these super-resolution methods usually directly transfer pixel data from an image (e.g., an image constrained to have similar or same content as the LR image) to the HR image, which can have undesirable effects. For instance, texture features from an image unlike texture features of a LR image may be transferred to a HR image, so that the super-resolution introduces unexpected and erroneous texture features into the HR image (e.g., a pattern may be distorted).

SUMMARY

Techniques, systems, and devices are described to super-resolve a LR image based on reference images. Reference images are not constrained to have similar or same content as the LR image. Content features (e.g., low-frequency details such as an outline, color, shape, and the like) of a LR image are extracted into a content feature map of the LR image. Texture features, such as representing details of hair, needles of a tree, eyelashes, small items, and the like, are extracted from a reference image and a version of the LR image upscaled to a same or similar scale as the reference image into respective texture feature maps. The texture feature maps indicate high-frequency content of the reference image and upscaled version of the LR image, respectively. The texture feature maps are densely sampled to form patches of the texture feature maps, and for each patch of the texture feature map of the upscaled version of the LR image, a matching patch from the texture feature map of the reference image is determined. A similarity score for each pair of matching patches is recorded in a weight map. In one example, a similarity score is determined from an inner product between matching patches. A swapped texture map is generated by replacing each patch of the texture feature map of the upscaled version of the LR image with its matching patch from the texture feature map of the reference image. Areas of the swapped texture map overlapped by multiple patches are averaged according to the overlapped patches. The content feature map and swapped texture map are combined according to the weight map, such as by adaptively fusing the content feature map and swapped texture map with a neural network. The neural network can be trained with LR images obtained by downsampling randomly-cropped patches of a HR image set and reference images obtained from other patches of the HR image set than the randomly-cropped patches. Training uses a loss function regularized by texture consistency between a super-resolution image and a reference image. Hence, a LR image can be super-resolved quickly, in the absence of, and without delay of locating, images having similar or same content as the LR image. Moreover, by matching patches at the texture-feature level, rather than content level, texture features consistent between images are transferred regardless of the content of the reference image. For instance, texture features extracted from a reference image of a building may be transferred to an image of a butterfly being super-resolved, though the building and butterfly are generally not similar or the same content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
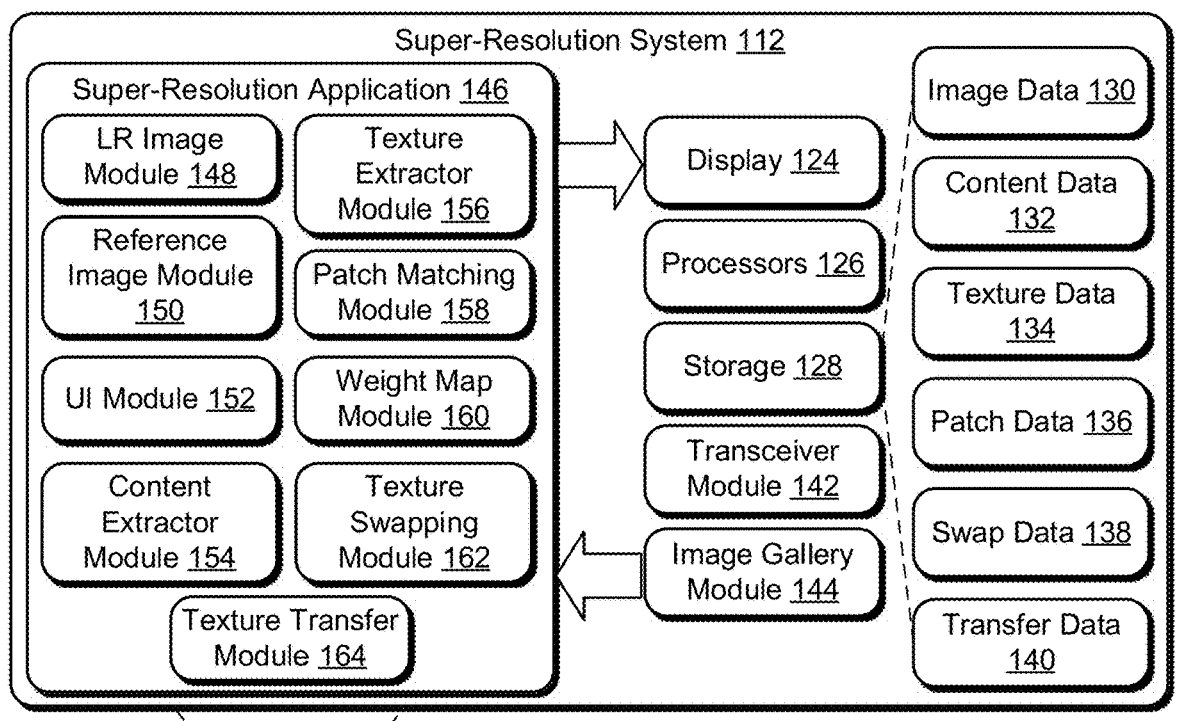
FIG. 1 illustrates a digital medium environment in an example implementation that is operable to employ techniques described herein.
Figure 1:
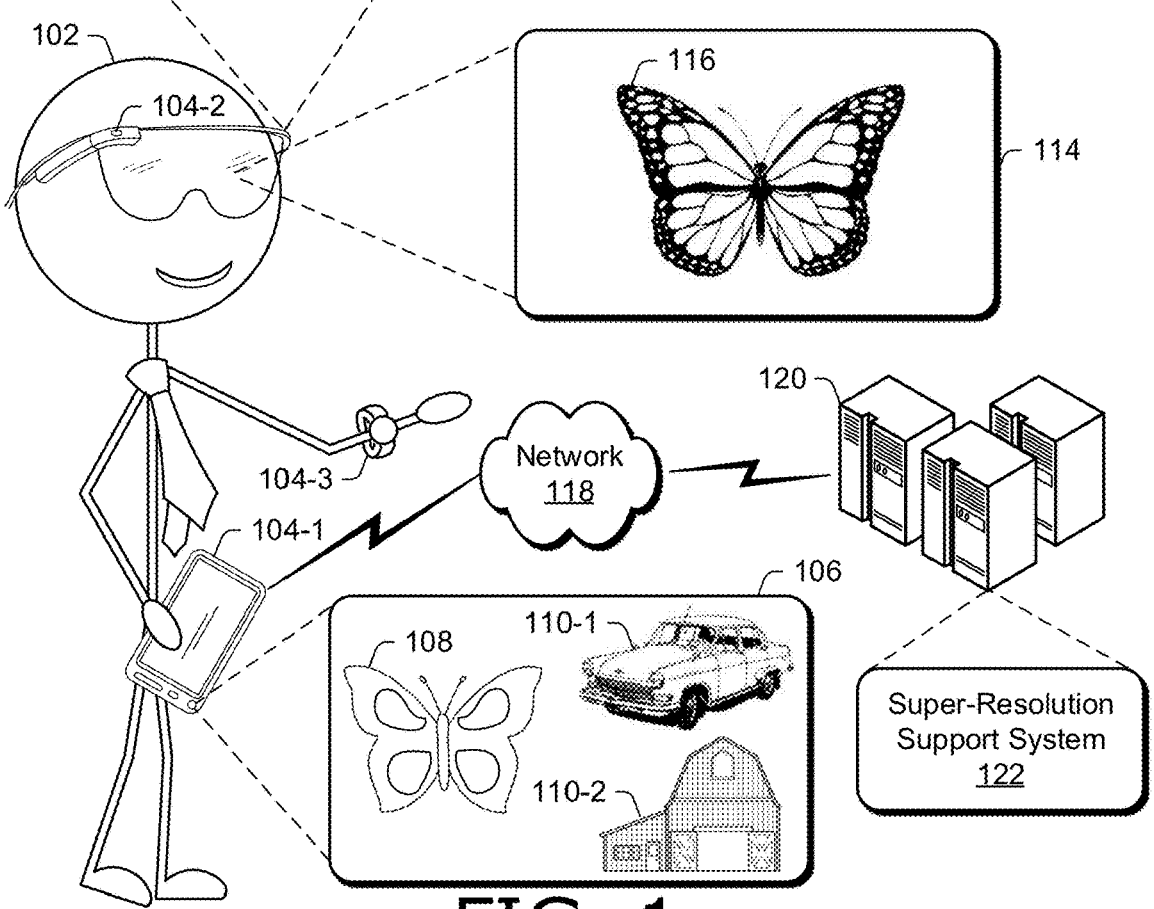

Super-resolution methods generate a HR image (e.g., a super-resolution image) from a corresponding LR image, such as by interpolation or constraining neighborhood similarity. However, these methods tend to blur high-frequency texture features. Super-resolution methods that fill in missing pixels of a LR image from images constrained to have similar or same content as the LR image, such as relying on other frames of a video sequence to upscale a frame of the video sequence, often suffer from a lack of perceptually sharp and realistic texture features because the high-frequency information of texture features is too detailed to be captured by content constrained to be similar or the same as content of the LR image. Moreover, super-resolution methods that directly transfer pixel data from a reference image to a HR image can transfer undesirable texture features (e.g., texture features dissimilar to texture features of a LR image being upscaled), so that the HR image includes unexpected and erroneous texture features that may distort the high frequency content of the HR image, such as by distorting a pattern in a super-resolution image.

Accordingly, this disclosure describes systems, techniques, and devices for generating a super-resolution image (e.g., a HR image) based on a LR image and one or more reference images that are not constrained to include similar or same content as the LR image, such as when reference images having similar or same content as the LR image are unavailable. For instance, a reference image depicting a building may be used to super-resolve a LR image depicting a butterfly, though the building and butterfly are not similar or the same content. Reference images can be obtained in any suitable way, such as by querying a database of images, by searching the Internet, receiving user-provided images, searching a user gallery of images, and the like. In one example, at least one reference image is obtained without constraining the at least one reference image to include same or similar content as a LR image.

Content features of a LR image to be super-resolved are extracted with a content extractor. Content features include low-frequency, high-level features of the LR image, such as an outline, color, shape, and the like. The LR image to be super-resolved is upscaled is so that it is in a same or similar scale (e.g., number of pixels) as a reference image. In one example, the LR image is upscaled to match a scale of a reference image with a pre-trained neural network, such as generative-adversarial network, a convolutional neural network, and the like.

A user interface is generated and exposed on a display depicting an image to be super-resolved, such as an up scaled version of a LR image or the LR image itself, and one or more reference images. In one example, a user selection of a region of one of the reference images is obtained via the user interface. For instance, a user may crop a region of a reference image, or select the region of the reference image to be cropped, such as with a mouse, keypad, touch gestures, combinations thereof, and the like, and the region used to super-resolve a corresponding region of a LR image.

High-frequency texture features are extracted from an upscaled version of the LR image and placed into a texture feature map for the upscaled version of the LR image. High-frequency texture features are also extracted from a reference image, such as from a region of a reference image selected by a user, and placed into a texture feature map for the reference image. Texture feature maps have a same or similar structure as the image from which texture features are extracted. For instance, the texture feature map for the reference image is a similar structure (e.g., size and shape) as the reference image. Moreover, texture features represent high-frequency content, such as details of hair, fur, needles of a tree, eyelashes, small items, patterns, sharp edges, and the like. Hence, texture feature maps encode high-frequency information of an image while removing low-frequency content, such as a color.

The texture feature map for the upscaled version of the LR image and the texture feature map for the reference image are densely sampled to generate patches of the texture feature maps. In one example, patches are 3 pixels by 3 pixels in size. For each patch of the texture feature map for the upscaled version of LR image, a best-matching patch is found in the texture feature map for the reference image. In one example, a best-matching patch is found by evaluating inner products of pairs of patches, one patch from each texture feature map. A best-matching patch is determined from the pair of patches having a largest inner product value. For each pair of matching patches (e.g., including a patch from the texture feature map for the upscaled version of the LR image and a respective best-matching patch from the texture feature map for the reference image), the respective inner product values indicate similarity scores, measured in a texture-feature domain, between matching patches, and are collected into a weight map. The weight map has a similar structure (e.g., size and shape) as the texture feature map for the reference image. In one example, a best-matching patch of the texture feature map for the reference image is determined by convolving the texture feature map for the upscaled version of the LR image with patches of the texture feature map for the reference image. In one example, a clamping function (e.g., a sigmoid function) is applied to the weight map that limits the similarity scores to be within an interval of scores, such as zero to one.

A swapped texture map is generated from the texture feature map for the upscaled version of the LR image and the matching patches by replacing each patch of the texture feature map for the upscaled version of the LR image with its corresponding best-matching patch from the texture feature map for the reference image. In one example, areas of the swapped texture map overlapped by multiple patches that are swapped into the swapped texture map are averaged. Patches from multiple texture feature maps of multiple respective reference images can be swapped into a swapped texture map.

The swapped texture map and the content feature map are combined according to the weight map to form a super-resolution image. In one example, the swapped texture map is multiplied by the weight map prior to being combined with the content map. Additionally or alternatively, the weight map can be used to accept or reject a patch of the swapped texture map when forming the super-resolution image. For instance, each similarity score of the weight map can be compared to a similarity threshold value (e.g., 0.7 on a scale of zero to one, zero representing no similarity, one representing equality). A best-matching patch can be accepted for inclusion in the combining to form the super-resolution image when the similarity score is greater than the similarity threshold, and rejected for inclusion in the combining to form the super-resolution image when the similarity score is less than the similarity threshold (e.g., the best-matching patch is not used to form the super-resolution image). Hence, unlike super-resolution methods that directly transfer pixels of an image to form a high-resolution image, by using a weight map to control similarity of texture features of patches being transferred, undesired texture features are not transferred to a super-resolution image, preserving texture consistency in the super-resolution image so that the super-resolution image accurately depicts high-frequency details.

Combining the swapped texture map and the content feature map is done with a neural network that adaptively fuses the content feature map and the swapped texture map. In one example, the neural network is trained with LR images obtained by downsampling randomly-cropped patches of a HR image set and reference images obtained from other patches of the HR image set than the randomly-cropped patches using a loss function regularized by texture consistency between images (e.g., a super-resolution image and a reference image).

Hence, a super-resolution image can be generated quickly, in the absence of, and without delay of locating, images having similar or same content as a LR image being super-resolved. In one example, reference images are randomly selected. Moreover, by matching patches at the texture feature level, rather than content level, texture features consistent between images are transferred regardless of image content.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one computing device, such as a mobile device with a touchscreen. In the example in FIG. 1, user 102 is illustrated as having three computing devices, computing device 104-1, computing device 104-2, and computing device 104-3 (collectively computing devices 104). For instance, computing device 104-1 depicts a tablet, computing device 104-2 depicts a pair of eye glasses, such as smart goggles, and computing device 104-3 depicts a wearable device, such as a smart wristwatch. Computing devices 104 are example computing devices, and any suitable computing device is contemplated, such as a mobile phone, tablet, laptop computer, desktop computer, gaming device, goggles, glasses, camera, digital assistant, wearable device (e.g., watch, arm-band, adhesive patch, etc.), echo device, image editor, non-linear editor, digital audio workstation, copier, scanner, and the like that may generate a super-resolution image from a LR image. Furthermore, discussion of one of computing devices 104 is not limited to that computing device, but generally applies to each of the computing devices 104. Moreover, computing devices 104 may range from full resource devices with substantial memory and processor resources (e.g., personal computers, game consoles) to a low-resource device with limited memory or processing resources (e.g., mobile devices).

Various types of input devices and input instrumentalities can be used to provide input to computing devices 104. For example, computing devices 104 can recognize input as being a mouse input, stylus input, touch input, input provided through a natural user interface, user gestures on a touchscreen, combinations thereof, and the like. Thus, computing devices 104 can recognize multiple types of gestures including touch gestures and gestures provided through a natural user interface. In one example, computing devices 104 include speech recognition, identification, and synthesis functionalities, microphones, and speakers that allow computing devices 104 to communicate with user 102 in a conversation. Moreover, computing devices 104 include an image capture device (e.g., a camera) configured to capture images and video streams.

Figure 11:
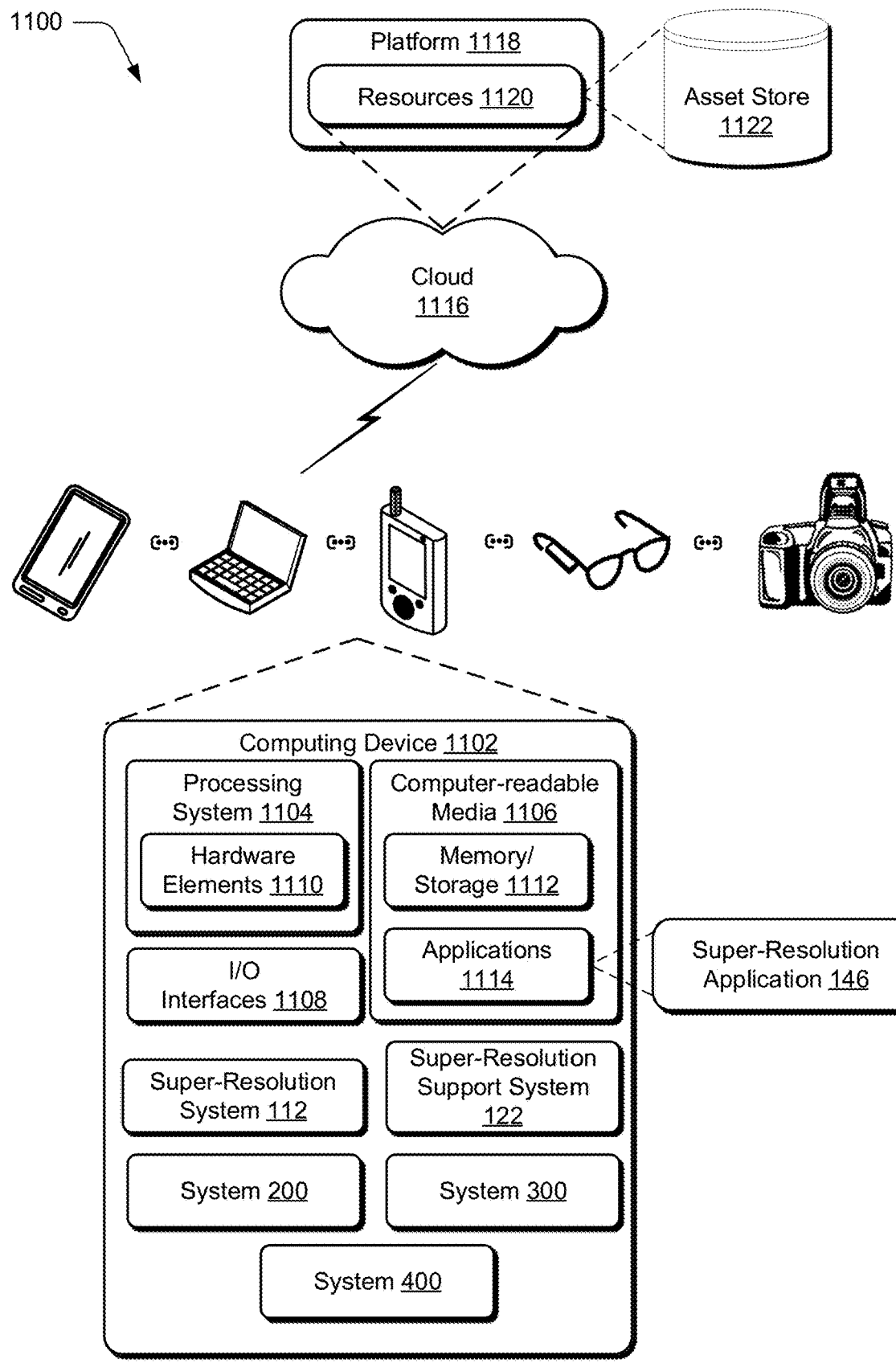
FIG. 11 illustrates an example system including various components of an example device that can be implemented

Furthermore, computing devices 104 may be representative of one or a plurality of different devices, such as one or more devices connected to a network that perform operations "over the cloud" as further described in relation to FIG. 11. In one example, computing devices 104 are communicatively coupled to each other, such as with a low power wireless communication standard (e.g., a Bluetooth® protocol). For instance, computing device 104-1 can communicate wirelessly with computing device 104-2. Hence, an image edited on one device (e.g., computing device 104-1) can be communicated to, and displayed on another device (e.g., computing device 104-2).

In the example illustrated in FIG. 1, user 102 obtains a digital image to be super-resolved. For instance, user interface 106, illustrated as a user interface of computing device 104-1, exposes image 108 (depicting a butterfly in the example). Image 108 can be any suitable digital image, such as an image captured by a camera included in one of computing devices 104, a digital image obtained from a database of images, such as stock photographs, a digital image generated from scanning an image captured by a film camera, an image stored in an image library of one of computing devices 104, and the like. In one example, image 108 is an image that has been upscaled to a same or similar scale as a reference image, such as reference image 110-1 or reference image 110-2.

User interface 106 also includes reference image 110-1 and reference image 110-2 (collectively reference images 110). User interface 106 can display any suitable number of references images. In the example in FIG. 1, two reference images are displayed in user interface 106. Reference image 110-1 depicts a car, and reference image 110-2 depicts a building (e.g., a barn). Reference images 110 are example reference images that do not contain content that is similar to or the same as content of image 108. For instance, a car and a building are not the same content as a butterfly (e.g., searching for the term "butterfly" would not generally produce reference images 110).

Super-resolution system 112 uses reference images 110 to upscale image 108 and generate a super-resolution image. For instance, user interface 114 of computing device 104-2 depicts super-resolution image 116 of a butterfly generated by super-resolution system 112 using reference images 110 and image 108. Super-resolution image 116 includes more high-frequency detail (e.g., texture features) than image 108, since super-resolution image 116 includes patches of texture maps of reference images 110 that have been adaptively fused with content features of image 108 by super-resolution system 112 (described below in more detail).

Furthermore, the example in FIG. 1 illustrates super-resolution of a digital image. However, super-resolution system 112 is not limited to super-resolution of digital images. Super-resolution system 112 can be used to super-resolve any suitable asset, such as a document (e.g., text or background of a document), frames of a video or animation sequence, a web page, a user interface, a desktop of a computing device, a map, a drawing, a presentation, combinations thereof, and the like.

Computing devices 104 are also coupled to network 118. Network 118 communicatively couples computing devices 104 with server 120 (for clarity, only computing device 104-1 is illustrated in FIG. 1 as coupled to network 118, though computing device 104-2 and computing device 104-3 can also be coupled to server 120 via network 118). Network 118 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 120 may include one or more servers or service providers that provide services and/or resources to computing devices 104. Generally, resources provided by server 120 may be licensed, purchased, or may be made freely available, (e.g., without authentication, license, or account-based access). The resources can include any suitable combination of services and content, such as made available over network 118 by one or more providers. Some examples of services include, but are not limited to, an on-line shopping service, a photo editing service, an image database service (e.g., a service providing reference images from a database), a web development and management service, a collaboration service, a social networking service, a messaging service, an advertisement service, a graphics design service, an image storage service (including storage and access of photos, documents, records, files, and the like), and so forth. Content may include various combinations of assets, including videos, ads, audio, multi-media streams, animations, images, reference images, web documents, web pages, applications, device applications, text documents, drawings, presentations, stock photographs, user profiles, user preferences, user data (e.g., images stored in an image gallery), and the like.

Server 120 includes super-resolution support system 122 configurable to receive signals from computing devices 104, process the received signals, and send the processed signals to computing devices 104 to support generation of a super-resolution image based on reference images. For instance, computing device 104-1 may obtain image 108 and receive a user selection from user 102 via user interface 106 indicative of a request to super-resolve image 108. Computing device 104-1 may communicate a request to server 120 together with one of reference images 110. Super-resolution support system 122 can receive the request and reference image, and generate a texture feature map of the reference image. Additionally or alternatively, super-resolution support system 122 may obtain other reference images and other texture feature maps for the other reference images from a database of reference images and texture feature maps. In one example, other reference images are determined based on their texture feature maps having similar texture features to the texture feature map of the reference image received from computing device 104-1. Similarity of texture features can be based on distances between patches of texture feature maps. Super-resolution support system 122 can communicate one or more texture feature maps to computing device 104-1, which uses the texture feature maps received from super-resolution support system 122 to generate a super-resolution image, such as super-resolution image 116. Accordingly, super-resolution support system 122 of server 120 can include a copy of super-resolution system 112, including super-resolution application 146 (discussed below in more detail).

Computing devices 104 include super-resolution system 112 to generate a super-resolution image based on reference images. For clarity, computing device 104-2 is illustrated in FIG. 1 as including super-resolution system 112, though computing device 104-1 and computing device 104-3 also include copies of super-resolution system 112 (not shown).

Super-resolution system 112 includes a display 124 for exposing user interfaces including digital images, such as super-resolution images (e.g., super-resolution image 116), LR images, upscaled versions of LR images, reference images (e.g., reference images 110), representations of images (e.g., thumbnail images, animations, etc.), and the like. Display 124 can be any suitable type of display, such as a liquid crystal display, plasma display, head-mounted display, projector and screen, a touchscreen that recognizes user gestures (e.g., touch gestures), and the like. A touchscreen of display 124 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like. Moreover, display 124 can display any suitable interface, such as user interface 106 and user interface 114.

Super-resolution system 112 also includes processors 126. Processors 126 can include any suitable type and number of processors. Hence, super-resolution system 112 may be implemented at least partially by executing instructions stored on storage 128 on processors 126. For instance, processors 126 may execute portions of super-resolution application 146.

Storage 128 can be any suitable type of storage accessible by or contained in super-resolution system 112. Storage 128 stores and provides access to and from memory included in storage 128 for any suitable type of data. For instance, storage 128 includes image data 130, including data associated with images, such as LR images, scaled versions of LR images, reference images, super-resolution images (e.g., HR images), regions of images selected by a user (e.g., a region of a reference image indicated by a crop gesture from which texture features are extracted and fused into a super-resolution image), sources of images (e.g., an indicator of a database or image gallery from which an image was obtained, descriptors of capture devices used to capture images, photographer's names who captured images, online stores where images are available, combinations thereof, and the like), metadata of images (e.g., settings of a capture device used to capture an image, such as aperture, shutter speed, focal length, ISO (a measure of light sensitivity of a camera sensor), global positioning system (GPS) coordinates of where an image was captured, a size of an image (e.g., a resolution in number of pixels), a date an image was captured, etc.), a format of an image (e.g., a file format), thumbnail images, combinations thereof, and the like.

Storage 128 also includes content data 132, including data regarding content features used by super-resolution system 112, such as content features extracted from an image (e.g., a LR image or scaled version of a LR image), content feature maps indicating low-frequency content features, indicators of content extractors used to extract content features (e.g., configuration settings of a content extractor, an identification number or version number of a contract extractor, a manufacturer of a content extractor, etc.), an indication of an image for which a content feature map corresponds, such as an image identification number in a database of images, combinations thereof, and the like.

Storage 128 also includes texture data 134, including data regarding texture features used by super-resolution system 112, such as texture features extracted from an image (e.g., a scaled version of a LR image of a reference image), texture feature maps indicating high-frequency texture features, indicators of texture extractors used to extract texture features (e.g., configuration settings of a texture extractor, an identification number or version number of a texture extractor, a manufacturer of a texture extractor), an indication of an image for which a texture feature map corresponds, such as an image identification number in a database of images, a number of texture feature maps, combinations thereof, and the like.

Storage 128 also includes patch data 136, including data regarding patches of texture feature maps used by super-resolution system 112, such as patches of texture feature maps obtained by dense sampling of the texture feature maps, inner product values of pairs of patches, such as between patches of different texture feature maps, similarity score maps, pairs of matching patches, such as including a patch from a texture feature map of a scaled version of a LR image and a best-matching patch from a texture feature map of a reference image, norms of patches, weight maps, combinations thereof, and the like.

Storage 128 also includes swap data 138, including data regarding swapped texture maps used by super-resolution system 112, such as swapped texture maps, indications of whether an area of a swapped texture map includes overlapping patches, indicators whether areas of overlapping patches are averaged, configurations of averaging algorithms used for overlapping patches, such as indicating a weighted average or mean, a number and indicators of reference images having texture feature maps whose patches have been swapped into a swapped texture feature map, combinations thereof, and the like.

Storage 128 also includes transfer data 140, including data regarding transferring textures by super-resolution system 112, such as data for a neural network that adaptively fuses a swapped texture map with a content feature map according to a weight map, e.g., training data, network configuration settings, weights, filters, and the like, parameters controlling application of a weight map to combining of a content feature map and a swapped texture map, such as whether to multiply a weight map with a swapped texture map, similarity thresholds used to compare against entries of a weight map to determine whether to accept or reject a patch of a swapped texture map in forming a super-resolution image, a loss function evaluated when combining a content feature map and a swapped texture map to form a super-resolution image, indicators of clamping functions (e.g., a sigmoid function, limiters, attenuators, etc.) applied to a weight map, including parameters controlling a boundary of accepting or rejecting a patch, combinations thereof, and the like.

Furthermore, super-resolution system 112 includes transceiver module 142. Transceiver module 142 is representative of functionality configured to transmit and receive data using any suitable type and number of communication protocols. For instance, data within super-resolution system 112 may be transmitted to server 120 with transceiver module 142. Furthermore, data can be received from server 120 with transceiver module 142. Transceiver module 142 can also transmit and receive data between computing devices 104. In one example, transceiver module 142 includes a low power wireless communication standard (e.g., a Bluetooth® protocol) for communicating data between computing devices 104.

Super-resolution system 112 also includes image gallery module 144. Image gallery module 144 is representative of functionality configured to obtain and manage images of super-resolution system 112, such as images to be super-resolved, reference images, thumbnail representations displayed in a user interface (e.g., thumbnail images of reference images exposed in a user interface), and the like. Hence, image gallery module 144 may use transceiver module 142 to obtain any suitable data from any suitable source, including obtaining digital images from a user's directory of files on computing devices 104 or server 120, obtaining images from a user's photo gallery (e.g., an online photo sharing service, images stored in a user's image editing application, such as Photoshop®), images a user has posted in a social media post, blog, online comment, and the like, images a user has attached to an email, text, or other communication sent from or received by computing devices 104, images provided by a search service, such as an online search for digital images related to a search query, images obtained from a database of stock images, images provided by user 102, images captured by a computing device, such as with a camera integrated into one of computing devices 104, and the like. Images obtained by image gallery module 144 are stored in image data 130 of storage 128 and made available to modules of super-resolution application 146. In one example, images from image gallery module 144 are used as reference images to super-resolve an image by super-resolution system 112.

Super-resolution system 112 also includes super-resolution application 146. Super-resolution application 146 includes LR image module 148, reference image module 150, user interface (UI) module 152, content extractor module 154, texture extractor module 156, patch matching module 158, weight map module 160, texture swapping module 162, and texture transfer module 164. These modules work in conjunction with each other to generate a super-resolution image from a LR image based on one or more reference images.

LR image module 148 is representative of functionality configured to initialize a LR image to be super-resolved. In one example, LR image module 148 scales a LR image to form a scaled image, such as by upscaling a LR image to be a same or similar scale (e.g., resolution in number of pixels) as a reference image. LR image module 148 can scale a LR image in any suitable way. In one example, LR image module 148 includes a pre-trained super-resolution network, such as a generative-adversarial neural network, a convolutional neural network, combinations thereof, and the like to scale a LR image to be of a same or similar scale as a reference image. These networks may enhance edges, but lack rich textures (e.g., high frequency details such as fur, hair, needles of a tree, patterns, and the like). Additionally or alternatively, LR image module 148 may contain a bicubic interpolator to upscale a LR image.

In one example, LR image module 148 scales an image by applying multiple scale factors to a LR image, such as a factor of two multiple times, a factor of two followed by a factor of one-and-a-half, combinations thereof, and the like. Additionally or alternatively, LR image module 148 can upscale a LR image, downscale a LR image, or both upscale and downscale a LR image to an appropriate scale, such as a scale similar or the same as a scale of a reference image.

A scaled image generated by LR image module 148, along with any suitable information, such as filters applied to an image, an indication of a network used to upscale a LR image, including configuration settings of the network, a number of times an image was scaled to arrive at a scaled image, an upscale factor, a downscale factor, and the like, used by or calculated by LR image module 148 are stored in image data 130 of storage 128 and made available to modules of super-resolution application 146. In one example, a scaled image generated by LR image module 148 is exposed in a user interface generated by UI module 152. For instance, a user may select a region of a scaled image generated by LR image module 148 in a user interface and a corresponding region of a reference image exposed in the user interface to super-resolve the region of the scaled image.

Reference image module 150 is representative of functionality configured to obtain reference images. Reference image module 150 can obtain any suitable reference image in any suitable way. In one example, reference image module 150 obtains reference images from a database of reference images, such as a database maintained by server 120. Additionally or alternatively, reference image module 150 obtains reference images as digital images from a database of digital images, such as a database of HR stock images maintained by server 120. Accordingly, reference images obtained by reference image module 150 can be HR images that contain rich textures (e.g., high-frequency content).

In one example, reference image module 150 obtains a reference image including a representation of the reference image, such as a thumbnail image, animation, cartoon, and the like, that can be displayed in a user interface of UI module 152. Additionally or alternatively, a user may supply a reference image to reference image module 150, such as by loading a file including a plurality of reference images into super-resolution system 112 (e.g., into storage at image data 130). In one example, reference image module 150 obtains a reference image from image gallery module 144.

A reference image obtained by reference image module 150 may include metadata, such as a source of a reference image (e.g., a database name and location where the reference image is stored, a photographer's name who captured an image, a computer application used to generate the reference image, and the like), a date a reference image was created or captured, a size of a reference image (number of pixels, file size, etc.), statistics of the reference image, such as color variance of the content of the reference image, a texture feature map of the reference image, a content feature map of the reference images, a representation of a reference image (e.g., a thumbnail image), and the like.

In one example, reference image module 150 obtains a reference image according to a user selection of a reference image. For instance, a user interface generated by UI module 152 may include a list of reference images, such as a drop-down list of user-selectable reference images or thumbnail representations of reference images. A user may select a reference image from the list, and responsive to the selection, reference image module 150 may obtain the selected reference image, such as from memory (e.g., local memory of storage 128), a database maintained by a server, such as server 120, and the like.

In one example, reference image module 150 obtains one or more reference images according to a selection rule. For instance, reference image module 150 may attempt to obtain images related to a LR image (e.g., having similar or same content as a LR image), such as an image in a photo album of the LR image with an enlarged region (e.g., due to zoom level, location of a camera, and the like), frames of a video sequence, an image captured with a different camera than the camera used to capture the LR image, images from a search (e.g., searching the Internet with a search engine) of images with like content, and the like. According to the selection rule, if images having similar or same content as a LR image are unavailable, reference image module 150 may obtain reference images without constraining the at least one reference image to include same or similar content as the LR image, such as by randomly selecting reference images, searching for reference images with certain texture features, and the like.

Additionally or alternatively, reference image module 150 can obtain at least one reference image without constraining the at least one reference image to include same or similar content as the LR image. For instance, reference image module 150 can obtain at least one reference image by randomly selecting the at least one reference image, such as by selecting a reference image based on matching an identification number of the reference image (e.g., a stock number, number used to locate images in a database, etc.) to a randomly-generated number generated by reference image module 150. In one example, a reference image obtained by reference image module 150 includes at least a portion of the reference image with random noise and without other content (e.g., the portion of the reference image may be a random shape having random noise and no other image content).

In one example, reference image module 150 obtains reference images based on texture features of the reference images. For instance, reference image module 150 can obtain reference images having patches of a texture feature map of the reference image within a threshold distance to a patch of a texture feature map of an image being super-resolved, such as a LR image or scaled LR image. Distance between patches may be measured in any suitable way, such as with an inner product of the patches. Reference images lacking a texture feature map having a sufficiently close patch to a patch of a texture feature map of an image being super-resolved may not be obtained (e.g., may be skipped) by reference image module 150.

A reference image obtained by reference image module 150, along with any suitable information, such as representations of reference image (e.g., thumbnail images), a source of a reference image (e.g., a database name and location where the reference image was obtained), an indication of whether the reference image was obtained responsive to a user selection, metadata of a reference image, a size of a reference image (number of pixels, file size, etc.), and the like used by or calculated by reference image module 150 are stored in image data 130 of storage 128 and made available to modules of super-resolution application 146. In one example, a reference image obtained by reference image module 150 is exposed in a user interface generated by UI module 152. For instance, a user may select a region of a scaled image generated by LR image module 148 in a user interface and a corresponding region of a reference image obtained by reference image module 150 to super-resolve the region of the scaled image.

UI module 152 is representative of functionality configured to generate, manage, and expose on any suitable display a user interface for generating a super-resolution image based on reference images. UI module 152 generates a user interface that can expose any suitable image, such as a LR image, a scaled version of a LR image (e.g., a scaled image), a super-resolution image (e.g., a HR image), a representation of a reference image (e.g., a thumbnail image), a reference image, combinations thereof, and the like. In one example, UI module 152 generates a user interface that exposes a scaled version of a LR image and a reference image. The user interface is configured to receive a user selection of a region of the reference image. For instance, a user may crop a region of a reference image with a pinch gesture or a cursor selection (e.g., click, hold, and drag with a mouse). Based on the region of the reference image selected by the user, super-resolution application 146 may generate a super-resolution image by fusing texture features extracted from a reference image with content features extracted from a LR image, and UI module 152 may expose the super-resolution image in a user interface generated by UI module 152.

A user interface of UI module 152 can expose any suitable data, such as options for selecting reference images, including lists of reference images and thumbnail images of reference images, directory structures (e.g., directory trees, database nodes, etc.), a search prompt (e.g., a text box where a user may enter a search query to obtain reference images, such as via an Internet search, a database search, a file search, and the like). In one example, a user interface of UI module 152 exposes thumbnail images of reference images. A user can select a thumbnail image of a reference image and cause the selected reference image to be exposed in a user interface. A user can then select a region of the reference image to be used to super-resolve a LR image. In one example, when a user selects a thumbnail image of a reference image, super-resolution system 112 automatically and without user intervention combines texture features of the reference image with content features of a LR image to generate a super-resolution image that is exposed in a user interface of UI module 152. Hence, a user can repeatedly select representations of reference images, causing update of a super-resolution image exposed in a user interface based on the selected reference image.

In one example, a user interface of UI module 152 exposes pixels corresponding to patches of texture feature maps. For instance, patch matching module 158 may determine pairs of matching patches from texture feature maps of a scaled image and a reference image, respectively, and project the matching patches to corresponding pixels of the scaled image and the reference image. A user interface of UI module 152 may expose the pixels corresponding to the matching patches.

A user interface generated by UI module 152, along with any suitable information, such as configurations settings of the user interface, user selections, user preferences, user histories, reference images, thumbnail representations, and the like, used by or calculated by UI module 152 are stored in storage 128 and made available to modules of super-resolution application 146. In one example, a user interface generated by UI module 152 is displayed on display 124.

Content extractor module 154 is representative of functionality configured to extract content features from an image into a content feature map. Content features indicate low-frequency details of an image, such as an outline, color, shape, and the like. Content extractor module 154 generates a content feature map depicting content features extracted from an image. Hence, a content feature map generated by content extractor module 154 has a similar or same structure (e.g., same size and shape) as an image from which a content feature map is generated.

Content extractor module 154 can extract content features from, and generate a content feature map for any suitable image. In one example, content extractor module 154 receives a LR image and extracts content features from the LR image into a content feature map of the LR image. Additionally or alternatively, content extractor module 154 receives a scaled image (e.g., an upscaled version of a LR image, such as an image that has been scaled by LR image module 148) and extracts content features from the scaled image into a content feature map of the scaled image.

Content extractor module 154 can extract content features with any suitable content feature extractor. In one example, content features are extracted with a rotationally-invariant feature descriptor, such as an oriented-fast and rotated-brief (ORB) descriptor. Additionally or alternatively, content extractor module 154 can extract content features with a scale-invariant feature transform (SIFT), speeded-up robust features (SURF), an edge detector, a corner detector, a blob detector, a color detector, combinations thereof, and the like.

A content feature map generated by content extractor module 154, along with any suitable information, such as configurations settings of a content feature extractor used to extract content features of an image into a content feature map, an indicator of an image for which a content feature map corresponds, a number of content features extracted, and the like, used by or calculated by content extractor module 154 are stored in content data 132 of storage 128 and made available to modules of super-resolution application 146. In one example, content extractor module 154 provides one or more content feature maps to texture transfer module 164.

Texture extractor module 156 is representative of functionality configured to extract texture features from an image into a texture feature map. Texture features indicate high-frequency details such as fur, hair, eyelashes, patterns, small items, and the like. Texture extractor module 156 generates a texture feature map depicting texture features extracted from an image. Hence, a texture feature map generated by texture extractor module 156 has a similar or same structure (e.g., same size and shape) as an image from which a texture feature map is generated, and encodes high-frequency information of the image while removing low-frequency information, such as color.

Texture extractor module 156 can extract texture features from, and generate a texture feature map for any suitable image. In one example, texture extractor module 156 receives multiple images and generates multiple respective texture feature maps. For instance, texture extractor module 156 may receive a reference image and a scaled version of a LR image at a first scale, and an additional version of the reference image at a different scale. The different scale may represent a larger image than the first scale. Texture extractor module 156 may generate a texture feature map for each of the images it receives (e.g., a first for the reference image at the first scale, a second for the scaled version of a LR image at the first scale, and a third for the additional version of the reference image at the different scale). Texture extractor module 156 may provide the texture feature maps at the first scale to patch matching module 158, and provide the texture feature map at the different scale to texture swapping module 162. Hence, patch matching may be done by patch matching module 158 with patches at a lower scale than patch swapping by texture swapping module 162 (and correspondingly texture transfer by texture transfer module 164).

Texture extractor module 156 can extract texture features into a texture feature map with any suitable texture feature extractor. In one example, texture extractor module 156 extracts texture features at a high level with a pre-trained neural network, such as a visual geometry group (VGG) convolutional neural network.

Texture feature maps generated by texture extractor module 156, along with any suitable information, such as configurations settings of a texture feature extractor used to extract texture features of an image into a texture feature map, an indicator of an image for which a texture feature map corresponds, sizes of texture feature maps, numbers of texture features extracted into a texture feature map, and the like, used by or calculated by texture extractor module 156 are stored in texture data 134 of storage 128 and made available to modules of super-resolution application 146. In one example, texture extractor module 156 provides texture feature maps to patch matching module 158 that determines pairs of matching patches (e.g., a patch from a first texture feature map and a best-matching patch from another texture feature map). Additionally or alternatively, texture extractor module 156 provides a texture feature map to texture swapping module 162 that generates a swapped feature map from the texture feature map.

Patch matching module 158 is representative of functionality configured to determine, for each patch of a texture feature map, a respective matching patch of another texture feature map. In one example, patch matching module 158 determines first patches of a first texture feature map and second patches of a second texture feature map, such as based on dense sampling of the texture feature maps. The first texture feature map can correspond to a scaled image (e.g., an upscaled version of a LR image), and the second texture feature map can correspond to a reference image. Patch matching module 158 determines, for each first patch of the first texture feature map, a respective matching second patch of the second texture feature map.

Patch matching module 158 can determine matching patches in any suitable way. In one example, patch matching module 158 determines matching patches based on an inner product between patches. For instance, patch matching module 158 determines a matching patch from among inner products of all patch pairs having a largest value. In one example, patch matching module 158 can determine a best-matching patch according to $$p_{i,j^*}^{REF} = \operatorname*{argmax}_{j} \left\langle \frac{p_i^{LR}}{\|p_i^{LR}\|}, \frac{p_j^{REF}}{\|p_j^{REF}\|} \right\rangle.$$

Here, $\langle \cdot \rangle$ denotes inner product, $p_i^{LR}$ is the i-th patch from a texture feature map of a LR image (or scaled image), $p_j^{REF}$ is the j-th patch from a texture feature map of a reference image, and $p_{i,j^*}^{REF}$ represents the matching patch from the texture feature map of the reference image to the i-th patch from a texture feature map of a LR image. Hence, $p_i^{LR}$ and $p_{i,j^*}^{REF}$ are a pair of matching matches. Norm $\|\cdot\|$ can be any suitable type of norm, such as $l_1$, $l_2$, and the like.

In one example, an inner product is evaluated by convolving a texture feature map of a LR image with patches of texture feature map of a reference image (described below in more detail with regards to FIG. 3).

Patch matching module 158 determines a similarity score for each pair of matching patches based on the inner product between the matching patches. In one example, patch matching module 158 determines a similarity score for each pair of matching patches according to $$s_{i,j^*} = \left\langle \frac{p_i^{LR}}{\|p_i^{LR}\|}, \frac{p_{i,j^*}^{REF}}{\|p_{i,j^*}^{REF}\|} \right\rangle.$$

Hence, a similarity score of matching patches measures a distance between matching patches in a high-level texture-feature space, rather than merely being based on similarity of content among patches.

Pairs of matching patches and respective similarity scores determined by patch matching module 158, along with any suitable information, such as norms of patches, indications of types of norms used, statistics of similarity scores, such as maximum, minimum, variance, mean, median, mode, a ratio of moments, and the like, used by or calculated by patch matching module 158 are stored in patch data 136 of storage 128 and made available to modules of super-resolution application 146. In one example, patch matching module 158 provides pairs of patches to texture swapping module 162 that generates a swapped feature map from the pairs of patches. Additionally or alternatively, patch matching module 158 can provide a texture feature map to texture swapping module 162, including a texture feature map obtained from texture extractor module 156.

Weight map module 160 is representative of functionality configured to generate a weight map indicating a respective similarity score between pairs of matching patches. In one example, weight map module 160 assembles similarity scores received from patch matching module 158 into a weight map. Additionally or alternatively, weight map module 160 normalizes similarity scores of the weight map by applying a clamping function to the weight map that limits the similarity scores to be within an interval of scores, such as between zero and one. Weight map module 160 can use any suitable clamping function, such as a sigmoid, linear limiter, and the like. In one example, for weight map W, weight map module 160 applies a sigmoid function, sigmoid (a·W+b), where a and b are user-selectable parameters, such as settable via a user interface of UI module 152. By accepting or rejecting a patch for inclusion into a super-resolution image based on a similarity score for the patch, parameters a and b control a boundary of accepting or rejecting patches into a super-resolution image generated by super-resolution system 112.

In one example, weight map module 160 sets similarity scores of the weight map that are less than a threshold similarity value to zero in the weight map. For instance, for similarity scores normalized to a range of zero to one, weight map module 160 may set similarity scores less than 0.2 in a weight map to zero. Accordingly, when weighting a texture feature map or swapped texture map by a weight map, such as with element-by-element multiplication, patches having a zero-valued similarity score are omitted in the map resulting from the multiplication. In this way, texture features that are dissimilar are rejected, and texture consistency is maintained.

A weight map generated by weight map module 160, along with any suitable information, such as statistics of similarity scores (e.g., maximum, minimum, variance, mean, median, mode, etc.), clamping functions applied to a weight map, parameters of clamping functions, thresholds used to zero similarity scores of a weight map, and the like, used by or calculated by weight map module 160 are stored in patch data 136 of storage 128 and made available to modules of super-resolution application 146. In one example, weight map module 160 provides a weight map to texture transfer module 164.

Texture swapping module 162 is representative of functionality configured to generating a swapped texture map. Texture swapping module 162 can generate a swapped texture map in any suitable way. In one example, texture swapping module 162 replaces each patch in a first texture feature map with a respective matching second patch from a second texture feature map to form a swapped texture map. For instance, texture swapping module 162 replaces each patch in a texture feature map of a LR image (or scaled version of a LR image) with a matching patch in a texture feature map of a reference image determined by patch matching module 158 to form a swapped texture map.

In one example, texture swapping module 162 averages areas of a swapped texture map overlapped by multiple patches from the second texture feature map that are swapped into the swapped texture map. Additionally or alternatively, texture swapping module 162 can include patches from multiple texture feature maps corresponding to multiple respective reference images. For instance, texture swapping module 162 may receive a plurality of texture feature maps and pairs of matching patches for a respective plurality of reference images, and swap patches from different texture feature maps into a swapped feature map. A first patch from a first texture feature map may be selected over a second patch from a second texture feature map based on a similarity score for the first patch being greater than a similarity score for the second patch. A weight map records the similarity score of the patch swapped into the swapped feature map.

A swapped texture map generated by texture swapping module 162, along with any suitable information, such as indicators of reference images whose texture features are contained in patches in a swapped texture map, a size of a swapped feature map, a number of patches swapped into a swapped feature map, and the like, used by or calculated by texture swapping module 162 are stored in swap data 138 of storage 128 and made available to modules of super-resolution application 146. In one example, texture swapping module 162 provides a swapped texture map to texture transfer module 164.

Texture transfer module 164 is representative of functionality configured to combine a content feature map and a swapped texture map according to a weight map and form a super-resolution image. Texture transfer module 164 can combine a content feature map and a swapped texture map according to a weight map in any suitable way. In one example, texture transfer module 164 includes a neural network that adaptively fuses a content feature map and a swapped texture map (discussed below in more detail with regards to FIG. 4). The neural network can be trained with LR images obtained by downsampling randomly-cropped patches of a HR image set and reference images obtained from other patches of the HR image set than the randomly-cropped patches. The neural network can be trained with a loss function regularized by texture consistency between images (e.g., a super-resolution image and a reference image).

Texture transfer module 164 generates a super-resolution image with consistent texture features, without erroneous textures that are introduced by other methods that directly transfer pixels of an image based on content, without regard to texture consistency. In one example, texture transfer module 164 compares a similarity score to a similarity threshold, and accepts or rejects a patch for inclusion into a super-resolution image based on the comparison. For instance, a patch from a swapped texture map may be accepted for inclusion in the combining to form the super-resolution image when the comparison indicates the similarity score is greater than the similarity threshold, and a patch may be rejected for inclusion in the combining to form the super-resolution image when the comparison indicates the respective similarity score is not greater than the similarity threshold. Additionally or alternatively, texture transfer module 164 can multiply a swapped texture map received from texture swapping module 162 by a weight map received from weight map module 160, and the result fused with a content feature map to form a super-resolution image. Accordingly, patches with higher similarity as measured by texture features are emphasized, and texture transfer module 164 ensures a super-resolution image is generated with consistent texture features.

A super-resolution image generated by texture transfer module 164, along with any suitable information, such as indicators of patches accepted for inclusion from a swapped texture map into a super-resolution image, indicators of patches rejected for inclusion from a swapped texture map into a super-resolution image, a loss value of a neural network combining a content feature map and a swapped texture map, and the like, used by or calculated by texture transfer module 164 are stored in transfer data 140 of storage 128 and made available to modules of super-resolution application 146. In one example, texture transfer module 164 provides a super-resolution image to UI module 152, which exposes the super-resolution image in a user interface.

Having considered an example digital medium environment, consider now a discussion of example systems in accordance with one or more aspects of the disclosure.

Example Super-Resolution Systems

Figure 2:
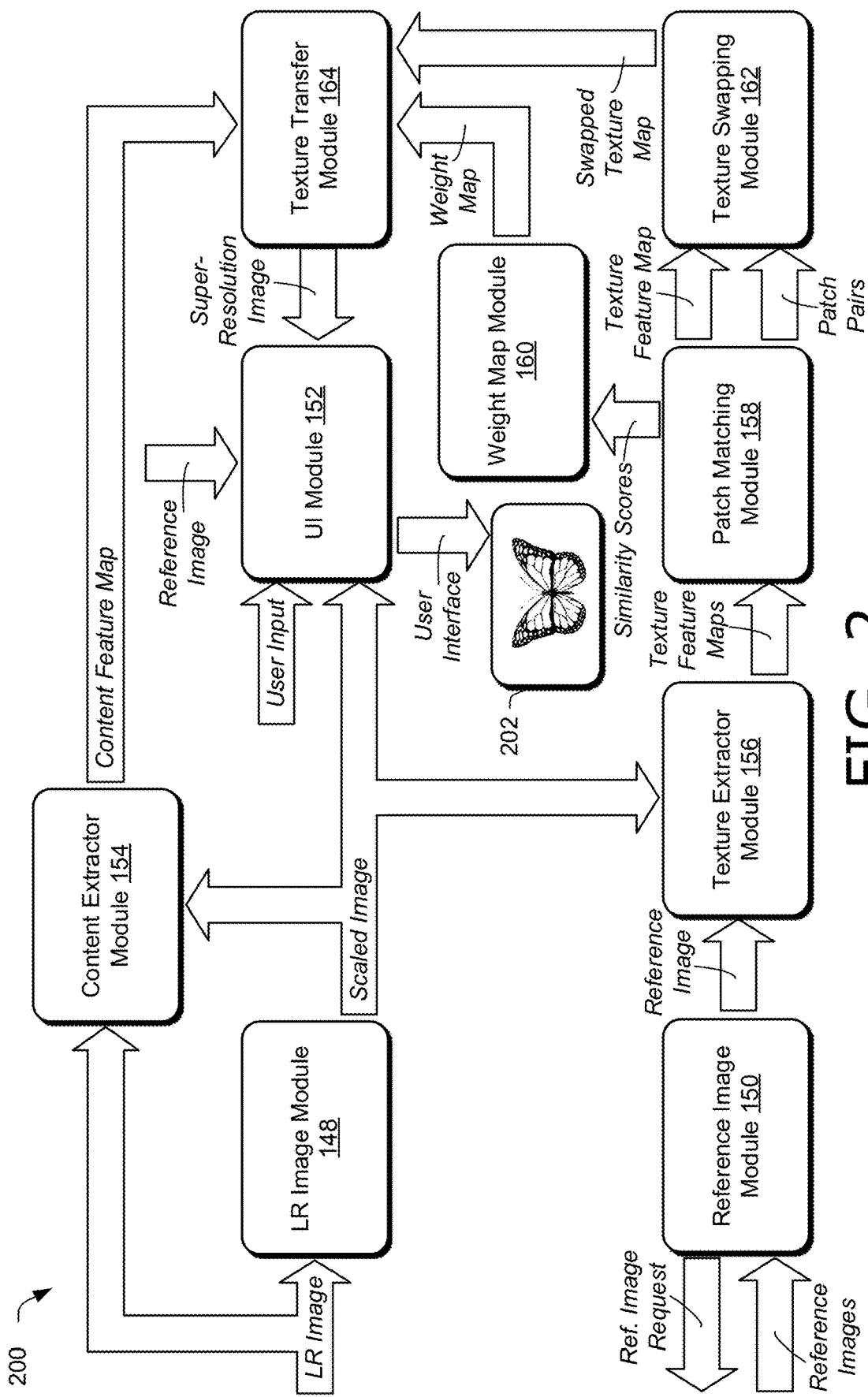
FIG. 2 illustrates an example system in accordance with one or more aspects of the disclosure.

FIG. 2 illustrates an example system 200 in accordance with one or more aspects of the disclosure. In this implementation, system 200 includes the modules of super-resolution application 146 as described in FIG. 1, e.g., LR image module 148, reference image module 150, UI module 152, content extractor module 154, texture extractor module 156, patch matching module 158, weight map module 160, texture swapping module 162, and texture transfer module 164. System 200 is one example of super-resolution system 112 that can be constructed using the modules of super-resolution application 146. For instance, signals can be redefined, and modules can be modified, combined, divided, added, or removed to form a modified system, without altering the functionality of system 200. Accordingly, such modified systems are considered to be within the scope of the disclosure.

Furthermore, for simplicity system 200 is limited to the modules of super-resolution application 146 and a description of some of their interconnects. System 200 can, however, include any suitable signals and communications between modules omitted for simplicity. Such signals may include system clocks, counters, image indicators, map indicators, reference image identification numbers, reset signals, and the like. In one example, system 200 can operate in real time (e.g., with no perceptible delay to a user) to generate and expose a super-resolution image. Accordingly, signals can be calculated by the modules of system 200 and communicated between the modules of system 200 without significant delay. In one example, system 200 can preemptively obtain reference images, so that once a LR image for super-resolution is received by system 200, reference images are presented to a user without delay of a user search for and selection of reference images. Furthermore, a user can use system 200 with multiple reference images, and select a region of a reference image to extract texture features from and apply to a LR image. Hence, a user may repeatedly load reference images into system 200 and "build" a super-resolution image by applying texture features from user-specified regions of a plurality of reference images.

Moreover, system 200 can be implemented on any suitable device or devices. In one example, system 200 is implemented on one computing device (e.g., one of computing devices 104 in FIG. 1). In another example, system 200 is implemented on more than one computing device. For instance, parts of system 200 can be implemented by a first computing device, such as computing device 104-1 in FIG. 1, and other parts of system 200 can be implemented by an additional computing device or devices, such as computing device 104-2. In one example, a server implements parts of system 200, such as server 120 in FIG. 1. A server can be remote, e.g., because it is not collocated with the first computing device. A server may be configured to receive signals of system 200 from a computing device (e.g., one or more of computing devices 104), process the received signals, such as with super-resolution support system 122, and transmit results of the processing back to the computing device. Hence, super-resolution support system 122 of server 120 in FIG. 1 may include system 200.

Additionally or alternatively, parts of system 200 can be implemented by an additional computing device that is collocated with a first computing device. For instance, one of computing devices 104 may be a first computing device, and another of computing devices 104 may be an additional, collocated computing device. The first computing device and the additional computing device may be operated by one or more users. Hence, system 200 provides for multiple users within an environment to share data included in system 200. For instance, a digital image may be obtained by a first computing device operated by a first user who selects a region of a first reference image and generates a first version of a super-resolution image based on the region of the first reference image. The first version of the super-resolution image and the first reference image can be sent to another computing device operated by a second user. The second user can then select a different region of the first reference image, a different reference image, or combinations thereof, and generate an updated version of the super-resolution image, which includes texture features based on the region of the first reference image introduced by the first user, as well as texture features introduced by the second user. The second user can then send the updated version of the super-resolution image back to the first user and the first computing device for consumption (e.g., display on a touch-screen, play in a video sequence, and the like).

LR image module 148 obtains a LR image to be super-resolved and generates a scaled image. In one example, a user loads a LR image into system 200 and selects an option in a user interface exposed by UI module 152 to super-resolve the LR image, such as a "super-resolve now" button. Responsive to a user selection to initiate super-resolution, the LR image may be provided to content extractor module 154. Additionally or alternatively, content extractor module 154 receives a LR image based on the LR image being loaded into system 200. In one example, a LR image obtained by LR image module 148 is exposed in a user interface of UI module 152.

LR image module 148 scales a LR image (e.g., upscales the LR image) to form a scaled image. LR image module 148 can scale a LR image in any suitable way, such as upscale, downscale, scale to a similar or same scale as a reference image, combinations thereof, and the like. In one example, LR image module 148 upscales a LR image to form a scaled image with a pre-trained generative-adversarial neural network. LR image module 148 provides a scaled image to content extractor module 154, UI module 152, and texture extractor module 156.

Content extractor module 154 receives a LR image and a scaled image from LR image module 148 and generates a content feature map. Content extractor module 154 can generate a content feature map in any suitable way. In one example, content extractor module 154 includes a content extractor, such as an ORB extractor, to extract content features (e.g., low-frequency information of an image) into one or more content feature maps. For instance, content extractor module 154 can extract features from a LR image into a content feature map. A content feature map can be any suitable content feature map. In one example, a content feature map of a LR image is a same or similar structure (e.g., size and shape) as the LR image.

Additionally or alternatively, content extractor module 154 receives a scaled image and can generate a content feature map of the scaled image. In one example, content extractor module 154 extracts features from a scaled image into a content feature map. Additionally or alternatively, a content feature map of a scaled image can be a same or similar structure (e.g., size and shape) as the scaled image. Content extractor module 154 provides a content feature map to texture transfer module 164.

Reference image module 150 obtains one or more reference images. Reference image module 150 can obtain reference images in any suitable way, such as by sending a request for reference images. Reference image module 150 may send a request for reference images for any suitable reason, such as responsive to a user selection of a thumbnail image in a user interface of UI module 152, responsive to a search query entered by a user, responsive to system 200 obtaining a LR image, combinations thereof, and the like.

In one example, texture extractor module 156 extract texture features from a scaled image, and reference image module 150 automatically and without user intervention obtains reference images having texture features that are similar to the texture features extracted from the scaled image, without regard to the content of the scaled image. For instance, reference image module 150 may obtain a reference image of a giraffe to super-resolve an image of a flower based on the image of the giraffe having texture features similar to texture features of the flower, and not based on the image of the giraffe depicting a giraffe and the image of the flower depicting a flower.

Additionally or alternatively, reference image module 150 can obtain reference images based on content. For instance, reference image module 150 may search for an image of an event taken from a closer distance or higher zoom level to use as a reference image to super-resolve an image of the event. In one example, reference image module 150 obtains a reference image from a different frame of a video sequence than a frame of a video sequence being super-resolved.

In one example, reference image module 150 obtains reference images based on a date, location, or combinations thereof of a reference image. For instance, system 200 may be super-resolving an image captured on a certain date and at a certain location indicated by GPS coordinates of the image, and reference image module 150 may obtain other images captured on the certain date, from or near the certain location, or combinations thereof, since other images captured on the certain date or near the certain location may include similar or same content as the image being upscaled.

Despite that reference image module 150 can obtain reference images based on content, reference image module 150 is not constrained to obtain reference images having same or similar content as a LR image being super-resolved. In one example, reference image module 150 randomly selects one or more reference images. Additionally or alternatively, a reference image may include random noise without other visual content. In one example, reference image module 150 selects a reference image based on the reference image having texture features similar to texture features of a LR image being super-resolved, as described above.

Reference image module 150 provides reference images to texture extractor module 156 and UI module 152. Texture extractor module 156 extracts texture features from any suitable image and generates any suitable number of texture feature maps. In one example, texture extractor module 156 extracts texture features from a whole reference image into a texture feature map of the reference image. Additionally or alternatively, UI module 152 receives a user input, such as a user-selection to indicate a region of a reference image (e.g., a crop gesture to crop the region of the reference image), and texture extractor module 156 extracts texture features from the region of the reference image (but not from other regions of the reference image) into a texture feature map of the reference image.

Furthermore, texture extractor module 156 can generate any suitable number of texture feature maps for any suitable images. In one example, texture extractor module 156 extracts features of a reference image and a scaled version of the reference image into respective texture feature maps. For instance, the scaled version of the reference image may be a downscaled version of the reference image. A texture feature map for the scaled version of the reference image can be used by patch matching module 158, but a texture feature map for the original version of the reference image (e.g., before the downscaling) can be used by texture swapping module 162 to generate a swapped texture map.

Texture extractor module 156 can use any suitable texture feature extractor. In one example, texture extractor module 156 includes a pre-trained VGG neural network to generate texture feature maps. Texture extractor module 156 provides texture feature maps to patch matching module 158, including a texture feature map for a LR image (e.g., a texture feature map of the LR image itself, a texture feature map of a scaled version of the LR image, or combinations thereof) and a texture feature map of a reference image to patch matching module 158. In one example, texture extractor module 156 provides multiple texture feature maps corresponding to respective multiple reference images to patch matching module 158.

Patch matching module 158 receives texture feature maps (e.g., a texture feature map for a LR image and a texture feature map of a reference image) and determines pairs of matching patches. For instance, patch matching module 158 determines first patches of a texture feature map for a LR image and second patches of a texture feature map of a reference image. For each first patch of the texture feature map for a LR image, patch matching module 158 determines a respective matching second patch of the texture feature map of a reference image. Hence, patch matching module 158 determines pairs of patches, each pair including a patch from one texture feature map and a matching patch from another texture feature map.

Patch matching module 158 can determine a matching patch to form pairs of patches in any suitable way. In one example, a matching patch from a texture feature map of a reference image is determined from a patch having a largest inner product value with a patch of the texture feature map for a LR image. Additionally or alternatively, patch matching module 158 determines a respective patch of a different texture feature map for each patch of one texture feature map by convolving the one texture feature map with patches of the different texture feature map and selecting a matching patch based on a largest value resulting from the convolution.

Furthermore, for each patch of a texture feature map for a LR image, patch matching module 158 determines a similarity score between matching patches. In one example, patch matching module 158 determines a similarity score from an inner product value of matching patches. Additionally or alternatively, patch matching module 158 determines a similarity score from a value resulting from convolving one texture feature map with patches of a different texture feature map, such as a largest output value of the convolution.

Patch matching module 158 provides similarity scores to weight map module 160 and patch pairs (e.g., pairs of matching patches) to texture swapping module 162. In one example, patch matching module 158 provides a texture feature map to texture swapping module 162, such as a texture feature map of a LR image or a scaled version of a LR image from which texture swapping module 162 generates a swapped texture map.

Weight map module 160 receives similarity scores from patch matching module 158 and generates a weight map. Weight map module 160 generates a weight map indicating a respective similarity score between pairs of matching patches. In one example, weight map module 160 populates a weight map with similarity scores received from patch matching module 158.

Additionally or alternatively, weight map module 160 can further process similarity scores included in a weight map, such as by applying a clamping function, such as a sigmoid function, to a weight map. Hence, weight map module 160 can normalize a weight map so that contents of the weight map are within an interval (e.g., a range of numbers), such as between zero and one. Weight map module 160 provides a weight map to texture transfer module 164.

Texture swapping module 162 receives patch pairs from patch matching module 158. Texture swapping module 162 can also receive texture feature maps, such as a texture feature map of a LR image, a texture feature map of a scaled version of a LR image, combinations thereof, and the like. Texture swapping module 162 can receive texture feature maps from patch matching module 158, texture extractor module 156, or combinations thereof. Texture swapping module 162 generates a swapped texture map.

Texture swapping module 162 can generate a swapped texture map in any suitable way. In one example, texture swapping module 162 generates a swapped texture map by replacing each patch in a first texture feature map with a respective matching patch from a second texture feature map. For instance, texture swapping module 162 can generate a swapped feature map by replacing each patch of a texture feature map of a scaled image with a respective matching patch for each patch from a texture feature map of a reference image.

In one example, texture swapping module 162 averages area of a swapped texture map where patches swapped into the swapped texture map overlap. For instance, texture swapping module 162 may compute an average value of overlapped portions $\theta_1$ and $\theta_2$ (e.g., $\theta_1$ corresponds to a portion of a first patch and $\theta_2$ corresponds to a portion of a second patch). Texture swapping module 162 can compute an average value of overlapped portions of patches in any suitable way. In one example, texture swapping module 162 compute an average value of overlapped portions from $x \cdot \theta_1 + y \cdot \theta_2$ where x and y are any suitable weights (e.g., 0.5 and 0.5, 1.0 and 0.0, 0.2 and 0.8, and the like).

Texture swapping module 162 provides a swapped texture map to texture transfer module 164. Texture transfer module 164 receives a weight map from weight map module 160, a swapped texture map from texture swapping module 162, and a content feature map from content extractor module 154, and generates a super-resolution image. Texture transfer module 164 combines a content feature map and a swapped texture map according to a weight map to form a super-resolution image. Texture transfer module 164 can combine a content feature map and a swapped texture map in any suitable way. In one example, texture transfer module 164 adaptively fuses a content feature map and a swapped texture map with a neural network. Results of the fusing can be upscaled to form a super-resolution image. The neural network can be pre-trained with LR images obtained by downsampling randomly-cropped patches of a HR image set and reference images obtained from other patches of the HR image set than the randomly-cropped patches. Moreover, the neural network can be trained according to a loss function regularized by texture consistency between images (e.g., a super-resolution image and a reference image), so that texture consistency is maintained.

Texture consistency in a super-resolution is also maintained by texture transfer module 164 through use of a weight map received by weight map module 160. For instance, texture transfer module 164 may pre-condition a swapped texture map received from texture swapping module 162 before combining the swapped texture map with a content feature map received from content extractor module 154. In one example, texture transfer module 164 multiplies a swapped texture map by a weight map (e.g., element-by-element multiplication) to emphasize patches of a swapped feature map that are similar according to a measure of texture features to patches of a LR image and resulting super-resolution image, and de-emphasize dissimilar patches.

In one example, texture transfer module 164 uses a weight map received from weight map module 160 to accept or reject a patch of a swapped texture map for inclusion into generation of a super-resolution image. For instance, texture transfer module 164 can compare similarity scores of a weight map to a similarity threshold, and accept or reject a patch based on its respective similarity score being greater than or not greater than a similarity threshold, respectively.

Texture transfer module 164 provides a super-resolution image to UI module 152. UI module 152 exposes a user interface, such as user interface 202. In the example in FIG. 2, user interface 202 exposes a super-resolution image of a butterfly generated by system 200.

UI module 152 also receives user inputs. In one example, UI module 152 receives user inputs indicative of selecting portions of multiple reference images to iteratively generate a super-resolution image based on the user inputs. For instance, a user may use system 200 to generate a first version of a super-resolution image using textures transferred from a first reference image, and UI module 152 may expose the first version of a super-resolution image. UI module 152 may also receive a user input indicative of a request to obtain an additional reference image. The additional reference image can be exposed in a user interface of UI module 152, and a user may select a region of the additional reference image for texture extraction. System 200 may, based on the user selection of the region of the additional reference image, update the first version of the super-resolution image using textures transferred from the region of the additional reference image to form an updated version of the super-resolution image. The updated version of the super-resolution image may be exposed in a user interface of UI module 152. A user may repeat these steps and iteratively apply texture features from different reference images to portions of a super-resolution image. Hence, a user may use system 200 to build a custom super-resolution image based on transferring texture features to selected regions of the super-resolution image from a plurality of reference images.

Figure 3:
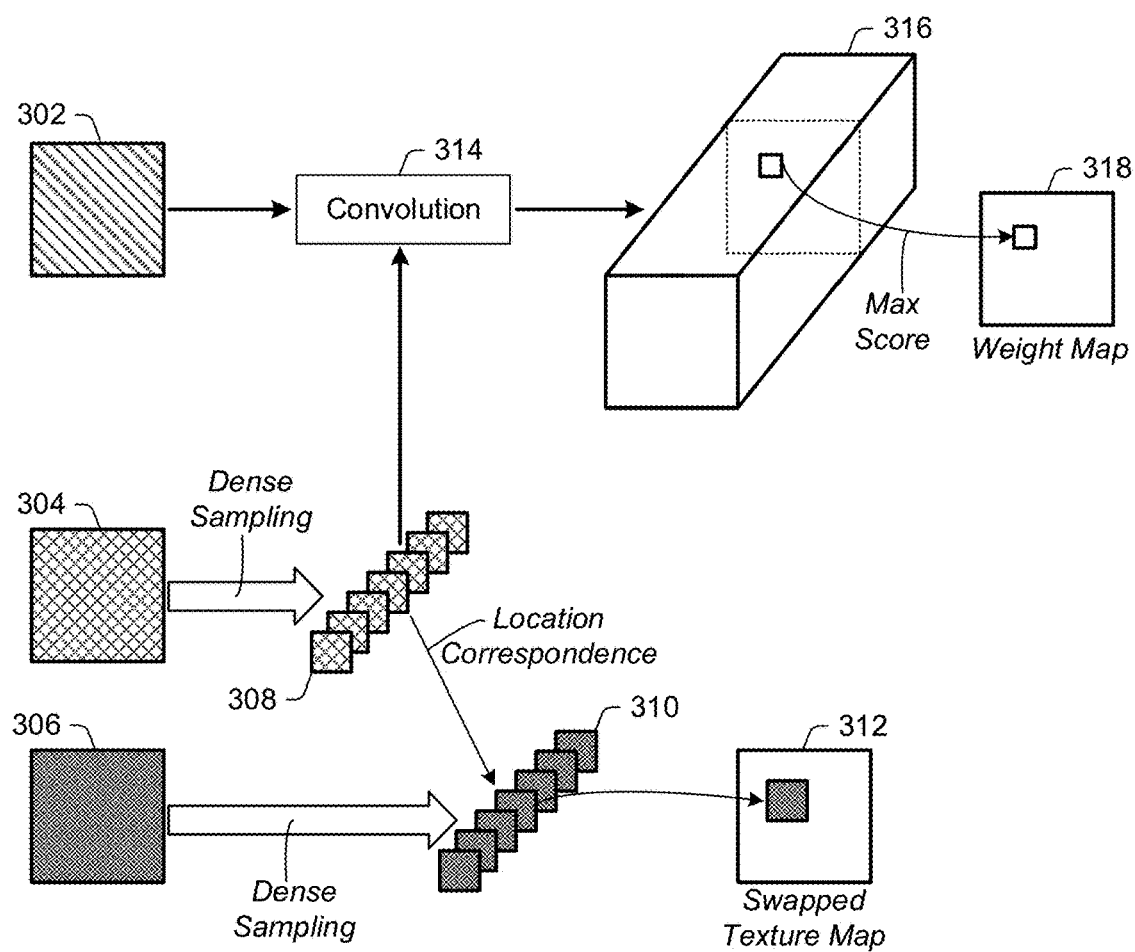
FIG. 3 illustrates an example system depicting example patch matching and example texture swapping in accordance with one or more aspects of the disclosure.

FIG. 3 illustrates an example system 300 depicting example patch matching and example texture swapping in accordance with one or more aspects of the disclosure. System 300 illustrates operations that can be performed by system 200 and its modules in FIG. 2, including patch matching module 158, weight map module 160, texture swapping module 162, and combinations thereof. In system 300, patches are interpreted as kernels, so that an inner product may be approximated as a convolution.

System 300 includes texture feature map 302, texture feature map 304, and texture feature map 306, which are examples of texture feature maps generated by texture extractor module 156 in FIG. 1 and FIG. 2. Texture feature map 302 is an example of a texture feature map of a LR image. Texture feature map 306 is an example of a texture feature map of a reference image that is a HR image. Texture feature map 304 is an example of a texture feature map of a downscaled version of the reference image used to generate texture feature map 306.

Texture feature map 304 and texture feature map 306 are densely sampled to create patches 308 and patches 310, respectively. System 300 generates swapped texture map 312 from patches 310 that are sampled from the HR version of the reference image. System 300 also performs patch matching with convolution 314 using patches 308 that are sampled from the downscaled version of the reference image. Hence, system 300 performs patching matching with patches at one scale and texture swapping with patches at a higher scale (e.g., finer resolution).

Texture feature map 302 of a LR image is convolved with patches 308 at convolution 314 and produces a sequence of similarity score maps 316. A maximum similarity score at each pixel location across similarity score maps 316 indicates a best-matched patch from patches 308. Each respective maximum score is recorded in weight map 318. Weight map 318 has a same structural identity as texture feature map 302.

For each matched patch selected from patches 308, a corresponding matched patch from patches 310 is determined, such as from the location correspondence between patches 308 and patches 310. Corresponding matched patches from patches 310 are used to generate swapped texture map 312, such as by swapping corresponding patches of patches 310 onto texture feature map 302 of a LR image.

Figure 4:
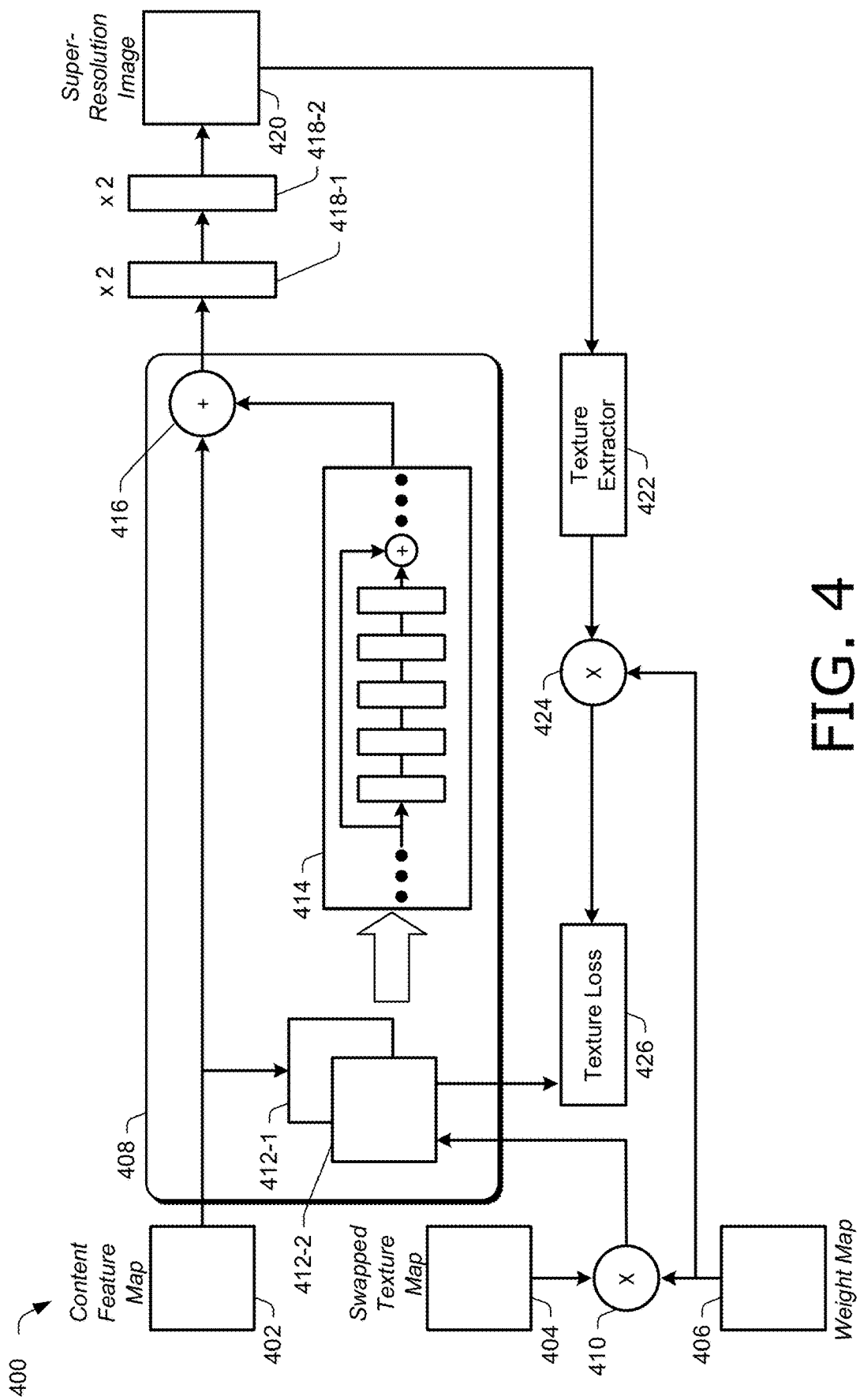
FIG. 4 illustrates an example system for transferring textures in accordance with one or more aspects of the disclosure.

FIG. 4 illustrates an example system 400 for transferring textures in accordance with one or more aspects of the disclosure. System 400 illustrates operations that can be performed by system 200 and its modules in FIG. 2, including texture transfer module 164, patch matching module 158, weight map module 160, texture swapping module 162, content extractor module 154, and combinations thereof.

System 400 obtains content feature map 402. Content feature map 402 is an example of content feature map generated by content extractor module 154. System 400 also obtains swapped texture map 404. Swapped texture map 404 is an example of a swapped texture map generated by texture swapping module 162. System 400 also obtains weight map 406. Weight map 406 is an example of a weight map generated by weight map module 160.

System 400 includes neural network 408, which fuses content feature map 402 and a weighted texture map formed from the product of weight map 406 and swapped texture map 404 at multiplier 410. In FIG. 4, multipliers and adders represent element-by-element multiplication and addition, respectively.

To maintain texture consistency when generating a super-resolution image, content feature map 402 is concatenated at 412-1 with a weighted texture map at 412-2. This concatenation represents the transfer of textures conditioned on content. The concatenation of content feature map with weighted texture map are provided as input to residual blocks 414, which are trained to extract textures from a weighted texture map conditioned on the content feature map. The extracted texture features are combined with content features at adder 416. Upscaling by a factor of two is done twice, once at upscale 418-1 and again at upscale 418-2 to form super-resolution image 420. In one example, upscale 418-1 and 418-2 use sub-pixel convolution as part of upscaling.

Texture features are extracted from super-resolution image 420 with texture extractor 422, such as to form a texture feature map, which is weighted by weight map 406 at multiplier 424. The weighted textures of super-resolution image 420 from multiplier 424 are provided to texture loss 426, which computes a loss that can be used to train neural network 408 and evaluate quality of super-resolution image 420.

For the objective of recovering a HR image $I^{HR}$ from a LR image $I^{LR}$ based on reference images $I^{Ref}$, the objective function can be written in terms of minimizing a loss function evaluated by texture loss 426. In one example, system 400 optimizes an objective function expressed as $$\hat{\theta} = \underset{\theta}{\mathrm{argmin}} \frac{1}{n} \sum_{i=1}^{n} \{\mathcal{L}_c(G_\theta(I_i^{LR}), I_i^{HR}) + \lambda \mathcal{L}_t(G_\theta(I_i^{LR}), I_i^{Ref})\}$$

Here, $G_\theta$ represents an end-to-end system, such as including system 400, system 200, system 300, and combinations thereof, and $\theta$ is a parameter of the system. Moreover, $\mathcal{L}_c$ represents content loss and $\mathcal{L}_t$ represents texture loss, with $\lambda$ representing a regularization value (e.g., a number between zero and one). Hence, the loss is regularized by texture consistency between images (e.g., a super-resolution image and a reference image).

Content loss $\mathcal{L}_c$ includes three components, a reconstruction loss, $\mathcal{L}_{rec}$, to preserve structural information, a perceptual loss, $\mathcal{L}_{per}$, and an adversarial loss, $\mathcal{L}_{adv}$, to boost visual quality. In one example, an $l_1$-norm is used for reconstruction loss, $$\mathcal{L}_{rec} = \frac{1}{HW} \sum_{x=1}^{H} \sum_{y=1}^{W} |I_{x,y}^{HR} - I_{x,y}^{SR}|$$

where H and W denote height and width of the super-resolution image $I^{SR}$, (e.g., super-resolution image 420), respectively.

Perceptual loss $\mathcal{L}_{per}$ can be measured in any suitable way. In one example, perceptual loss is based on a VGG model (e.g., VGG19) with $$\mathcal{L}_{per} = \frac{1}{V} \sum_{i=1}^{C} \|\phi_i(I^{HR}) - \phi_i(I^{SR})\|_F$$

where V and C indicate tensor volume and channel number of feature maps, respectively, and $\phi_i$ denotes the i-th channel of the feature maps extracted from a hidden layer of the VGG model. $\|\cdot\|_F$ denotes Frobenius norm.

Adversarial loss $\mathcal{L}_{adv}$ can be measured in any suitable way in an adversarial-generative network. In one example, the adversarial loss and an objective of adversarial-generative network are expressed as $$\mathcal{L}_{adv} = -\mathbb{E}_{\tilde{x} \sim \mathbb{P}_g}[D(\tilde{x})], \underset{G}{\min} \underset{D \in \mathcal{D}}{\max} \mathbb{E}_{x \sim \mathbb{P}_r}[D(x)] - \mathbb{E}_{\tilde{x} \sim \mathbb{P}_g}[D(\tilde{x})]$$

where D is the set of 1-Lipschitz functions, and $\mathbb{P}_r$ and $\mathbb{P}_g$ are the model distribution and real data distribution, respectively.

Texture loss $\mathcal{L}_t$ preserves consistency between content and transferred textures, and uses a weight map (e.g., weight map 406) to suppress undesired textures. In one example, texture loss is expressed as $$\mathcal{L}_t = \frac{1}{4V^2} \|Gr(\phi(I^{SR}) \otimes M^s) - Gr(M^t)\|_F$$

where $Gr(\cdot)$ denotes a Gram matrix operator, $M^s$ denotes a weight map of similarity scores, $M^t$ denotes a swapped texture map (e.g., swapped texture map 404), and $\otimes$ denotes element-wise multiplication (e.g., element-by-element multiplication).

Neural network 408 can be trained with LR images obtained by downsampling randomly-cropped patches of a HR image set as input images. Reference images for training can be obtained from other patches of the HR image set than the randomly-cropped patches. The loss function used for training is regularized by texture loss $\mathcal{L}_t$ which preserves texture consistency between images.

The systems described herein constitute an improvement over systems that constrain reference images to have similar or same content as a LR image being super-resolved and that directly transfer pixel content of a reference image to a super-resolution image. The systems described herein are not constrained to use reference images having similar or same content as a LR image being super-resolved. Rather, the systems described herein obtain any suitable reference image, such as without regard to matching content of a reference image to a LR image being super-resolved. Hence, reference images can be quickly and easily obtained, even in the absence of reference images having similar or same content. Furthermore, texture features are matched at a high-level via texture feature maps, instead of being matched based on content. Similarity scores of pairs of matching patches are recorded in a weight map and used to combine content features and texture features, so that texture consistency is maintained when generating a super-resolution image. Hence, systems described herein generate accurate super-resolution images without artifacts introduced by erroneous texture features, unlike systems that directly transfer pixel content of a reference image to a super-resolution image.

Having considered example systems, consider now a discussion of example user interfaces and images in accordance with one or more aspects of the disclosure.

Example User Interfaces and Images

Figure 5:
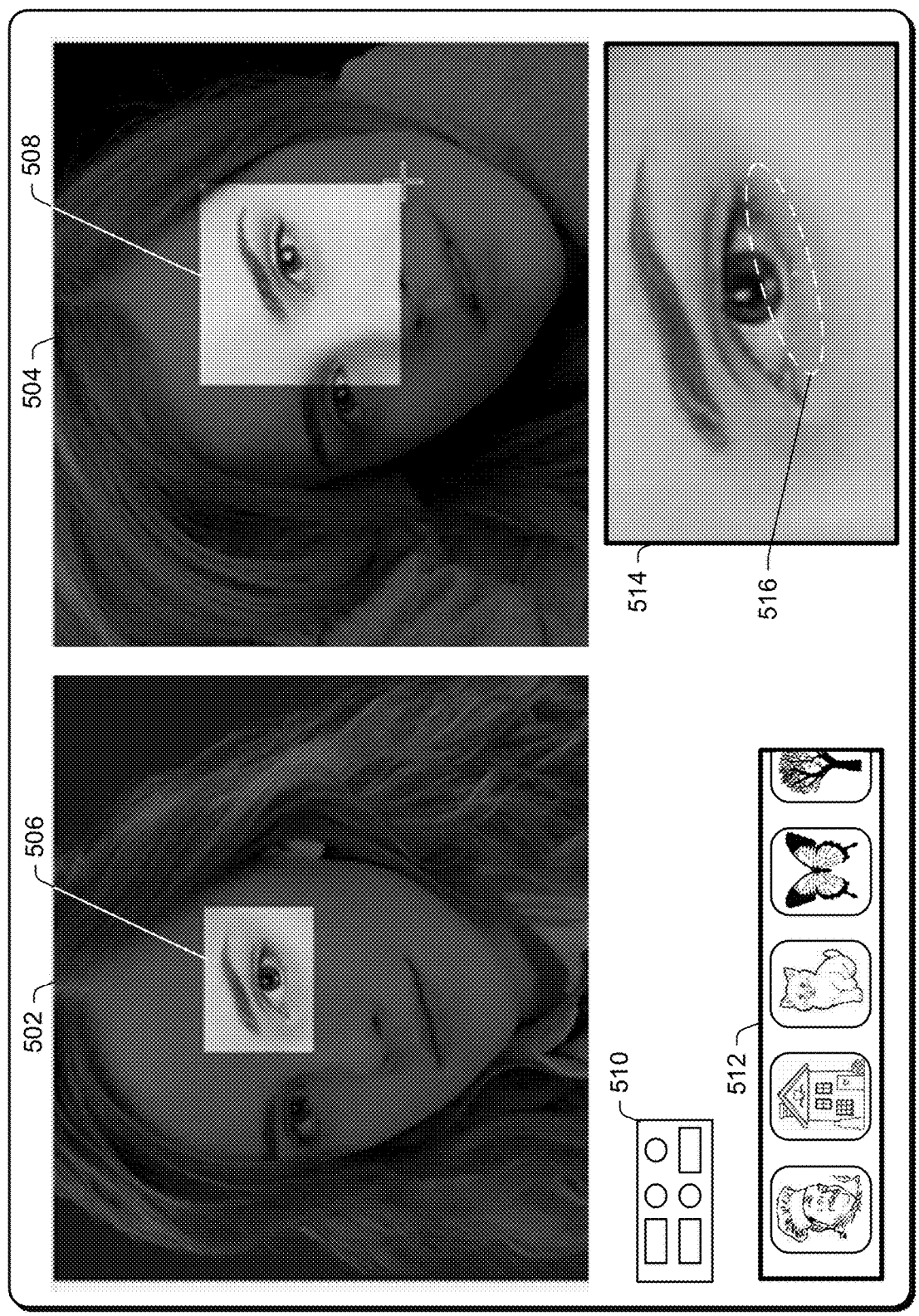
FIG. 5 illustrates an example user interface in accordance with one or more aspects of the disclosure.

FIG. 5 illustrates an example user interface 500 in accordance with one or more aspects of the disclosure. User interface 500 is an example of a user interface generated by UI module 152 in FIG. 1 and FIG. 2. User interface 500 exposes image 502 and reference image 504. Image 502 can be any suitable image to be super-resolved. In one example, image 502 includes a LR image obtained by LR image module 148 in FIG. 2. Additionally or alternatively, image 502 can include a scaled image (e.g., an upscaled version of a LR image) generated by LR image module 148 in FIG. 2.

In the example in FIG. 5, image 502 depicts a woman and includes region 506 that is highlighted relative to the rest of image 502. In one example, a user selects region 506 of image 502, such as with a selection tool, crop tool, touch gesture, speech gesture, mouse input, keyboard input, combinations thereof, and the like. Region 506 indicates a region of image 504 that is to be super-resolved, such as with texture features extracted from region 508 of reference image 504.

For instance, reference image 504 depicts an image of a woman and includes region 508. However, reference image 504 depicts a different perspective of the woman depicted in image 502. Region 508 of reference image 504 is highlighted relative to the rest of reference image 504. In one example, a user selects region 508 of reference image 504, such as with a selection tool, crop tool, touch gesture, speech gesture, mouse input, keyboard input, combinations thereof, and the like. Region 508 indicates a region of reference image 504 from which texture features are extracted to super-resolve image 502. Hence, a user may select any region of a reference image to super-resolve a region of a LR image.

User interface 500 includes controls 510 suitable to control user interface 500 and its contents. Controls 510 can include any suitable control, such as adjusters for brightness, contrast, color, selection of filters, shading, crop, overlay, import, export, font type, size and color, selection of representations of reference images (e.g., thumbnail images, cartoons, animations, text descriptions, etc.), zoom, a "super-resolve now" button to enable super-resolution of image 502, and the like.

User interface also includes toolbar 512. Toolbar 512 can include any suitable representations of any suitable data for user interface 500. In the example illustrated in FIG. 5, toolbar 512 contains thumbnail image representations of reference images. In one example, a user selects one of the representations of reference images in toolbar 512, such as with a double-tap gesture, and causes the reference image corresponding to the selected thumbnail image to be exposed in user interface 500, such as in place of image 504. Hence, a user may change between reference images used to transfer textures to super-resolve image 502 by selecting thumbnail representations of reference images in toolbar 512.

In the example in FIG. 5, a user selects region 508 of reference image 504, and user interface 500 exposes super-resolution image 514. In one example, super-resolution image 514 is exposed in user interface 500 responsive to a user selection to enable super-resolution, such as a "super-resolve now" button in toolbar 512. Additionally or alternatively, super-resolution image 514 is exposed in user interface 500 responsive to a user selection of region 508.

Super-resolution image 514 corresponds to region 506 of image 502, and includes rich texture details absent in image 502. For instance, ellipse 516 indicates high-frequency details of the woman's eyelashes absent in image 502. In one example, a user may accept super-resolution changes indicated in super-resolution image 514, such as with a button of controls 510, and, responsive to the user selection to accept, image 502 may be updated by applying the super-resolution changes indicated in super-resolution image 514 to image 502. Additionally or alternatively, image 502 may be updated by applying the super-resolution changes indicated in super-resolution image 514 to image 502 responsive to a user selection to enable super-resolution, such as a "super-resolve now" button in toolbar 512, or a user selection of region 508.

Figure 6:
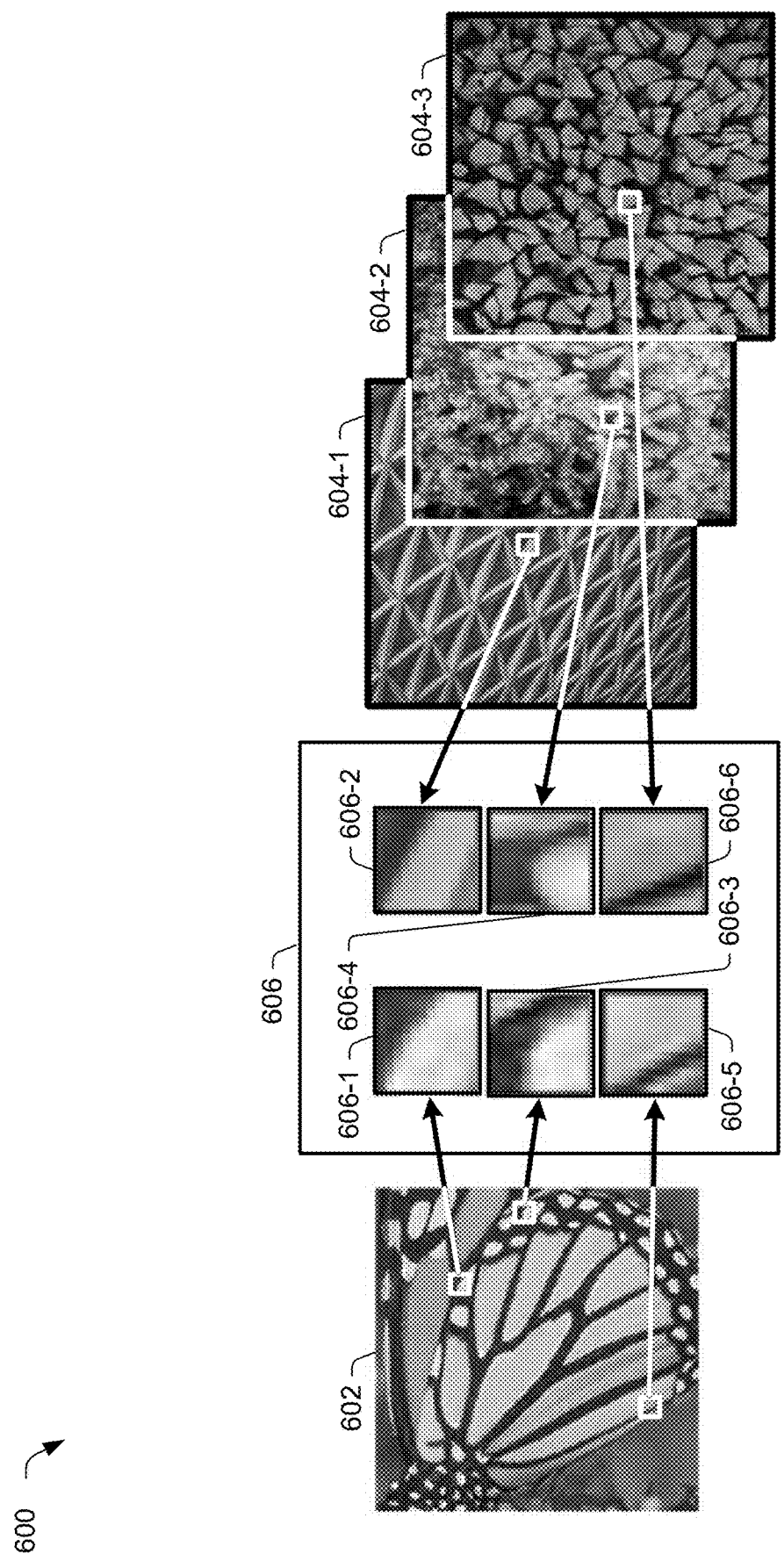
FIG. 6 illustrates example images in accordance with one or more aspects of the disclosure.

FIG. 6 illustrates example images 600 in accordance with one or more aspects of the disclosure. Images 600 includes image 602. Image 602 is an example of a scaled image generated by LR image module 148 in FIG. 1 and FIG. 2. For instance, image 602 depicts a butterfly and is an image to be super-resolved by system 200 in FIG. 2.

Images 600 also include three reference images, reference image 604-1, reference image 604-2, and reference image 604-3 (collectively reference images 604). Reference images 604 are examples of reference images obtained by reference image module 150 in FIG. 1 and FIG. 2. For instance, reference images 604 may be obtained by searching a database of images.

Reference images 604 contain dissimilar content to image 602. For instance, reference image 604-1 depicts a roof of a building, reference image 604-2 depicts coral in an ocean, and reference image 604-3 depicts split wood that has been stacked. Content of reference images 604 is not the same as or similar to content of image 602. For instance, a search, such as an Internet search, for "butterfly" is not likely to return reference images 604.

Images 600 also includes patch projections 606. Patch projections 606 depict pixel-level projections of matching patches of texture feature maps, such as matching patches determined by patch matching module 158 in FIG. 1 and FIG. 2. For instance, patches of a texture feature map of image 602 have been matched to patches of respective texture feature maps of reference images 604, and pixel-level projections of these patches are illustrated by patch projections 606, rather than the patches of texture feature maps themselves.

A left column of patch projections 606 corresponds to image 602, and a right column of patch projections 606 corresponds to reference images 604. For instance, patch projection 606-1 and patch projection 606-2 correspond to a matching patch pair, one patch from a texture feature map of image 602 and the other patch from reference image 604-1. Patch projection 606-3 and patch projection 606-4 also correspond to a matching patch pair, one patch from a texture feature map of image 602 and the other patch from reference image 604-2. Patch projection 606-5 and patch projection 606-6 also correspond to a matching patch pair, one patch from a texture feature map of image 602 and the other patch from reference image 604-3.

In one example, reference images 604 are obtained based on similarities of matching patches represented by patch projections 606. For instance, reference image module 150 in FIG. 1 and FIG. 2 may select reference images 604 from a database of images based on inner products of matching patches represented by patch projections 606 being greater than a threshold value.

Figure 7:
FIG. 7 illustrates example images in accordance with one or more aspects of the disclosure.
Figure 7:
Figure 7:
Figure 7:
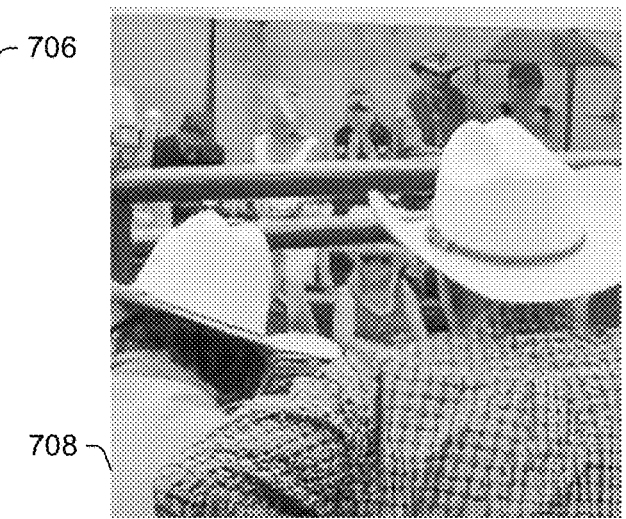
Figure 7:
Figure 7:
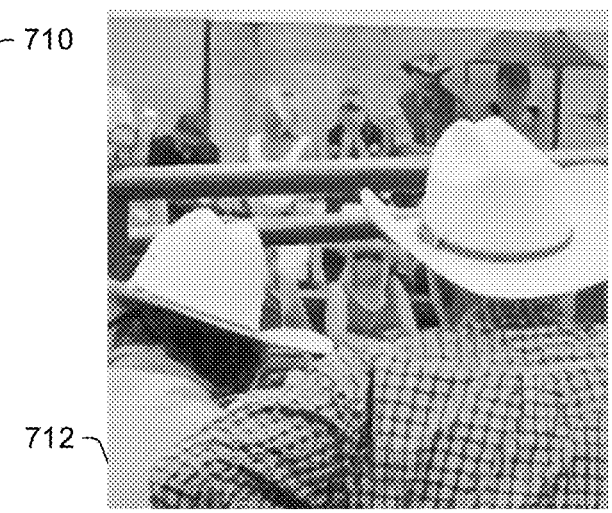

FIG. 7 illustrates example images 700 in accordance with one or more aspects of the disclosure. Images 700 include six images. HR image 702 is a HR image that is downscaled to produce LR image 704. LR image 704 is super-resolved with super-resolution methods described herein and compared to results of other super-resolution methods.

For instance, image 706 is a super-resolved image obtained by applying bicubic interpolation to LR image 704. However, bicubic interpolation fails to generate high-frequency texture features, since these texture details cannot be recovered by interpolation. Hence, image 706 appears blurry.

Image 708 is a super-resolved image obtained by applying a generative-adversarial neural network to LR image 704. Image 708 includes better texture features than image 706, but suffers from distortion of high-frequency details. For instance, the plaid pattern of the shirt in image 708 includes distortions to the plaid pattern.

Reference image 710 is a reference image whose texture features are extracted and used to generate super-resolution image 712 with the methods described herein, such as with system 200 in FIG. 2, system 300 in FIG. 3, system 400 in FIG. 4, or combinations thereof. By using the methods and systems described herein, super-resolution image 712 is generated by transferring texture features of reference image 710 conditioned on content of LR image 704, so that consistency between texture and content is maintained in super-resolution image 712. Furthermore, consistency between texture features is maintained in super-resolution image 712 by using a weight map that measures distance in a high-level texture-feature space to accept or reject patches of a texture feature map of reference image 710. Hence, super-resolution image 712 presents more realistic textures than image 706 and image 708, and does not include distortion of high-frequency details in the plaid pattern, like image 708.

Having considered example user interfaces and example images, consider now a discussion of example procedures for generating a super-resolution image based on reference images in accordance with one or more aspects of the disclosure.

Example Procedures

Figure 8:
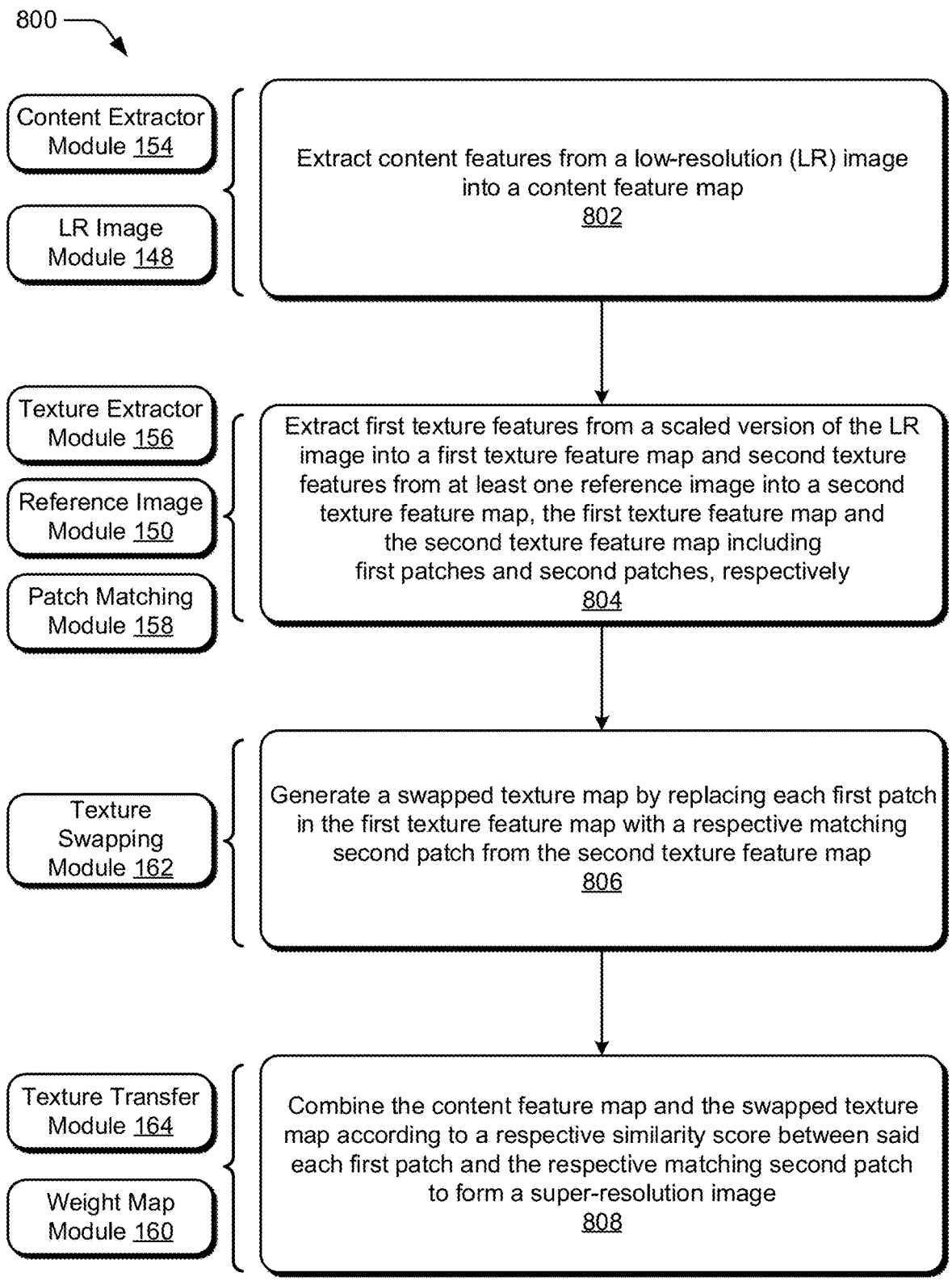
FIG. 8 illustrates a flow diagram depicting an example procedure in accordance with one or more aspects of the disclosure.

FIG. 8 illustrates an example procedure 800 for generating a super-resolution image based on reference images in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 120 of FIG. 1 that makes use of a super-resolution system, such as system 200 in FIG. 2, system 300 in FIG. 3, system 400 in FIG. 4, or super-resolution system 112 in FIG. 1. A super-resolution system implementing procedure 800 may be an independent application that has been installed on the computing device, a service hosted by a service provider that is accessible by the computing device, a plug-in module to the computing device, or combinations thereof.

Content features are extracted from a low-resolution (LR) image into a content feature map (block 802). In one example, content extractor module 154 extracts content features from the LR image into a content feature map. Additionally or alternatively, the content features represent lower frequency content of the LR image than the first texture features. For instance, the content features may represent shapes, contours, and colors, and the first texture features may represent patterns, edges, and high-frequency details.

First texture features are extracted from a scaled version of the LR image into a first texture feature map and second texture features are extracted from at least one reference image into a second texture feature map (block 804). The first texture feature map and the second texture feature map include first patches and second patches, respectively. In one example, patch matching module 158 determines first patches of the first texture feature map and second patches of the second texture feature map, such as by dense sampling of the respective texture feature maps generated by texture extractor module 156.

In one example, texture extractor module 156 extracts first texture features from a scaled image (e.g., a scaled version of the LR image) into a first texture feature map indicating high-frequency content of the scaled image and second texture features from the at least one reference image into a second texture feature map indicating high-frequency content of the at least one reference image.

Additionally or alternatively, LR image module 148 can scale a LR image to form a scaled image (e.g., a scaled version of the LR image). In one example, scaling includes upscaling the LR image to a resolution of the at least one reference image. Additionally or alternatively, LR image module 148 can generate a scaled image with a pre-trained generative-adversarial neural network.

In one example, reference image module 150 obtains the at least one reference image. Additionally or alternatively, the at least one reference image is obtained without constraining the at least one reference image to include same or similar content as the LR image. In one example, the at least one reference image includes multiple reference images.

A swapped texture map is generated by replacing each first patch in the first texture feature map with a respective matching second patch from the second texture feature map (block 806). In one example, texture swapping module 162 generates a swapped texture map by replacing said each first patch in the first texture feature map with the respective matching second patch from the second texture feature map. Hence, a swapped texture map as a same structure as the scaled image.

In one example, patch matching module 158 determines, for each first patch of the first texture feature map, a respective matching second patch of the second texture feature map. Additionally or alternatively, the respective matching second patch for said each first patch can be determined by generating inner product values between pairs of said each first patch and the second patches, and selecting the respective matching second patch from one of the pairs having a largest inner product value. In one example, the respective similarity score between said each first patch and the respective matching second patch is based on the largest inner product value.

The content feature map and the swapped texture map are combined according to a respective similarity score between said each first patch and the respective matching second patch to form a super-resolution image (block 808). In one example, weight map module 160 generates a weight map indicating a respective similarity score between said each first patch of the first texture feature map and the respective matching second patch of the second texture feature map, and texture transfer module 164 combines the content feature map and the swapped texture map according to the weight map to form a super-resolution image.

In one example, the combining includes comparing the respective similarity score to a similarity threshold, accepting the respective matching second patch for inclusion in the combining to form the super-resolution image when the comparing indicates the respective similarity score is greater than the similarity threshold, and rejecting the respective matching second patch for inclusion in the combining to form the super-resolution image when the comparing indicates the respective similarity score is not greater than the similarity threshold.

Additionally or alternatively, the combining can include multiplying the swapped texture map by the weight map, fusing results of the multiplying with the content feature map, and upscaling results of the fusing to form the super-resolution image.

In one example, the combining is performed with a neural network of the computing device, the neural network trained with LR images obtained by downsampling randomly-cropped patches of a HR image set and reference images obtained from other patches of the HR image set than the randomly-cropped patches.

Figure 9:
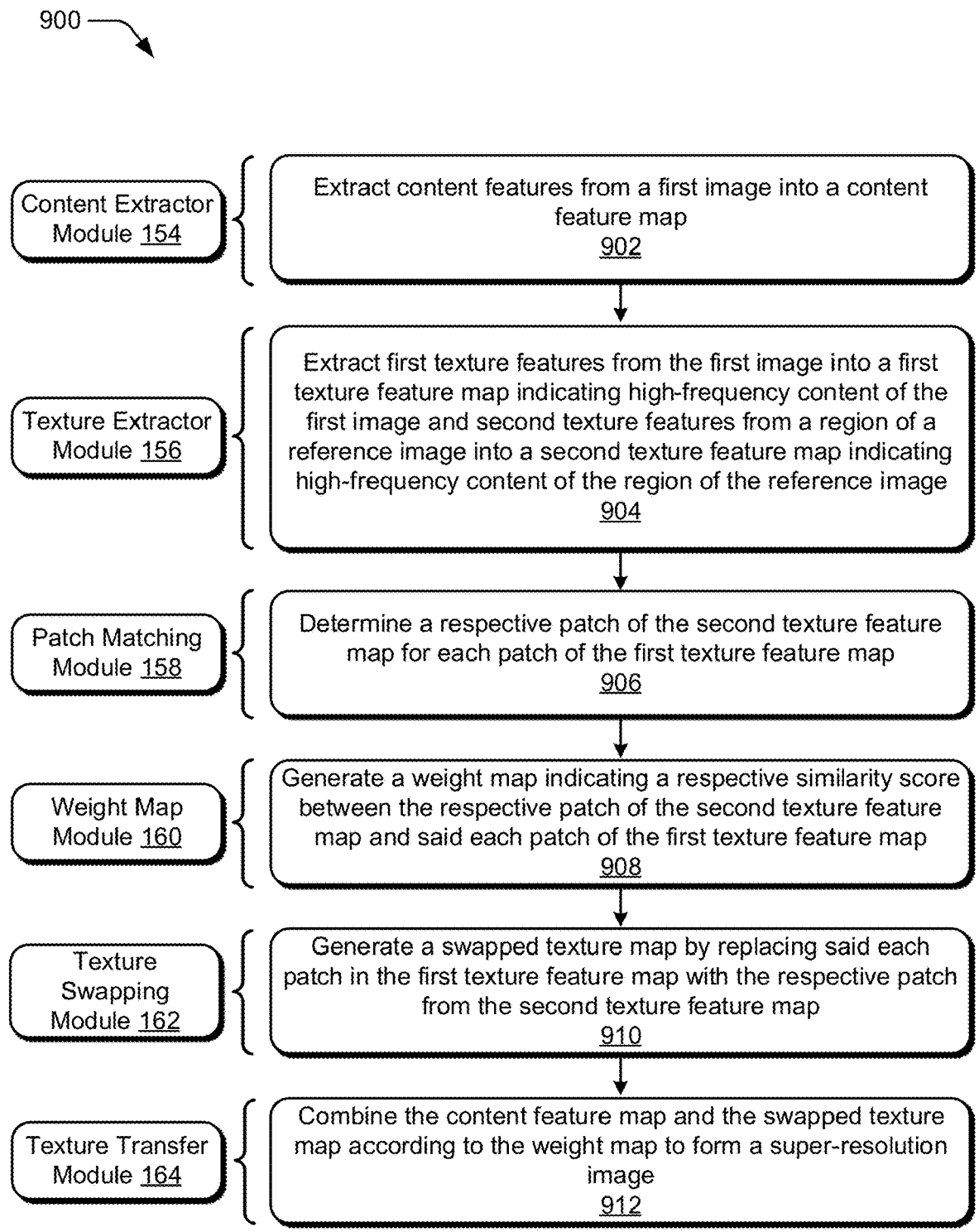
FIG. 9 illustrates a flow diagram depicting an example procedure in accordance with one or more aspects of the disclosure.
Figure 10:
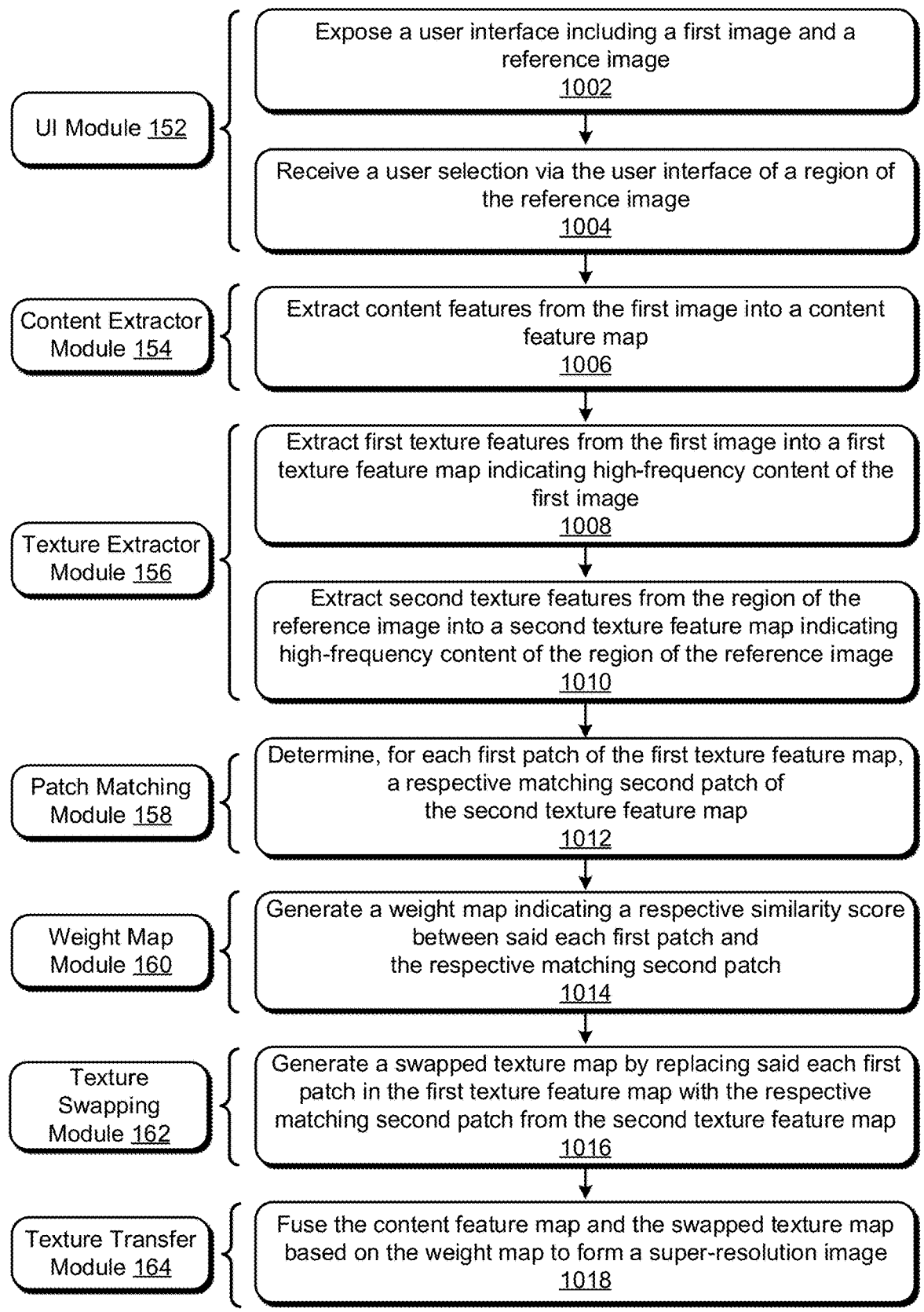
FIG. 10 illustrates a flow diagram depicting an example procedure in accordance with one or more aspects of the disclosure.

FIG. 9 illustrates an example procedure 900 for generating a super-resolution image based on reference images in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 120 of FIG. 1 that makes use of a super-resolution system, such as system 200 in FIG. 2, system 300 in FIG. 3, system 400 in FIG. 4, or super-resolution system 112 in FIG. 1. A super-resolution system implementing procedure 900 may be an independent application that has been installed on the computing device, a service hosted by a service provider that is accessible by the computing device, a plug-in module to the computing device, or combinations thereof.

Content features are extracted from a first image into a content feature map (block 902). In one example, content extractor module 154 extracts content features from the first image into a content feature map.

First texture features are extracted from the first image into a first texture feature map indicating high-frequency content of the first image and second texture features are extracted from a region of a reference image into a second texture feature map indicating high-frequency content of the region of the reference image (block 904). In one example, texture extractor module 156 extracts first texture features from the first image into a first texture feature map indicating high-frequency content of the first image and second texture features from the region of the reference image into a second texture feature map indicating high-frequency content of the region of the reference image.

In one example, UI module 152 exposes a user interface including the first image and the reference image. The first image can be an upscaled version of a low-resolution image, such as generated by LR image module 148 in FIG. 1 and FIG. 2, and the reference image module can be obtained by reference image module 150 in FIG. 1 and FIG. 2. UI module 152 can receive a user selection of the region of the reference image. In one example, the user selection indicates to crop the reference image to designate the region of the reference image.

A respective patch of the second texture feature map is determined for each patch of the first texture feature map (block 906). In one example, patch matching module 158 determines a respective patch of the second texture feature map for each patch of the first texture feature map. Additionally or alternatively, patch matching module 158 determines the respective patch of the second texture feature map for each patch of the first texture feature map by convolving the second texture feature map with patches of the second texture feature map.

A weight map indicating a respective similarity score between the respective patch of the second texture feature map and said each patch of the first texture feature map is generated (block 908). In one example, weight map module 160 generates a weight map indicating a respective similarity score between the respective patch of the second texture feature map and said each patch of the first texture feature map.

A swapped texture map is generated by replacing said each patch in the first texture feature map with the respective patch from the second texture feature map (block 910). In one example, texture swapping module 162 generates a swapped texture map by replacing said each patch in the first texture feature map with the respective patch from the second texture feature map. Additionally or alternatively, texture swapping module 162 can be further configured to average areas of the swapped texture map overlapped by multiple respective patches from the second texture feature map that are swapped into the swapped texture map.

The content feature map and the swapped texture map are combined according to the weight map to form a super-resolution image (block 912). In one example, texture transfer module 164 combines the content feature map and the swapped texture map according to the weight map to form a super-resolution image. Additionally or alternatively, texture transfer module 164 combines the content feature map and the swapped texture map according to the weight map with a neural network trained according to a loss function regularized by texture consistency between the super-resolution image and the reference image.

FIG. 1000 illustrates an example procedure 1000 for generating a super-resolution image based on reference images in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing devices 104 or server 120 of FIG. 1 that makes use of a super-resolution system, such as system 200 in FIG. 2, system 300 in FIG. 3, system 400 in FIG. 4, or super-resolution system 112 in FIG. 1. A super-resolution system implementing procedure 1000 may be an independent application that has been installed on the computing device, a service hosted by a service provider that is accessible by the computing device, a plug-in module to the computing device, or combinations thereof.

A user interface including a first image and a reference image is exposed (block 1002). In one example, UI module 152 exposes a user interface including a first image and a reference image. In one example, the reference image includes a portion containing random noise without other content.

A user selection is received via the user interface of a region of the reference image (block 1004). In one example, UI module 152 receives user selection via the user interface of a region of the reference image.

Content features are extracted from the first image into a content feature map (block 1006). In one example, content extractor module 154 extracts content features are extracted from the first image into a content feature map.

First texture features are extracted from the first image into a first texture feature map indicating high-frequency content of the first image (block 1008). In one example, texture extractor module 156 extracts first texture features from the first image into a first texture feature map indicating high-frequency content of the first image.

Second texture features are extracted from the region of the reference image into a second texture feature map indicating high-frequency content of the region of the reference image (block 1010). In one example, texture extractor module 156 extracts second texture features from the region of the reference image into a second texture feature map indicating high-frequency content of the region of the reference image.

For each first patch of the first texture feature map, a respective matching second patch of the second texture feature map is determined (block 1012). In one example, patch matching module 158 determines, for each first patch of the first texture feature map, a respective matching second patch of the second texture feature map.

A weight map indicating a respective similarity score between said each first patch and the respective matching second patch is generated (block 1014). In one example, weight map module 160 generates a weight map indicating a respective similarity score between said each first patch and the respective matching second patch. In one example, the respective similarity score indicated by the weight map is determined from an inner product between said each first patch normalized by a norm of said each first patch and the respective matching second patch normalized by a norm of the respective matching second patch. Additionally or alternatively, similarity scores of the weight map are normalized by applying a clamping function to the weight map that limits the similarity scores to be within an interval of scores.

A swapped texture map is generated by replacing said each first patch in the first texture feature map with the respective matching second patch from the second texture feature map (block 1016). In one example, texture swapping module 162 generates a swapped texture map by replacing said each first patch in the first texture feature map with the respective matching second patch from the second texture feature map.

The content feature map and the swapped texture map are fused based on the weight map to form a super-resolution image (block 1018). In one example, texture transfer module 164 fuses the content feature map and the swapped texture map based on the weight map to form a super-resolution image.

The procedures described herein constitute an improvement over procedures that constrain reference images to have similar or same content as a LR image being super-resolved and that directly transfer pixel content of a reference image to a super-resolution image. The procedures described herein are not constrained to use reference images having similar or same content as a LR image being super-resolved. Rather, the procedures described herein obtain any suitable reference image, such as without regard to matching content of a reference image to a LR image being super-resolved. Hence, reference images can be quickly and easily obtained, even in the absence of reference images having similar or same content. Furthermore, texture features are matched at a high-level via texture feature maps, instead of being matched based on content. Similarity scores of pairs of matching patches are recorded in a weight map and used to combine content features and texture features, so that texture consistency is maintained when generating a super-resolution image. Hence, procedures described herein generate accurate super-resolution images without artifacts introduced by erroneous texture features, unlike procedures that directly transfer pixel content of a reference image to a super-resolution image.

Having considered example procedures in accordance with one or more implementations, consider now example systems and devices that can be utilized to practice the inventive principles described herein.

Example Systems and Devices

FIG. 11 illustrates an example system generally at 1100 that includes an example computing device 1102 that is representative of one or more computing systems and devices that may implement the various techniques described herein. This is illustrated through inclusion of super-resolution system 112, system 200, system 300, system 400, super-resolution application 146, and super-resolution support system 122, which operate as described above. Computing device 1102 may be, for example, a user computing device (e.g., one of computing devices 104), or a server device of a service provider, (e.g., server 120). Furthermore, computing device 1102 may include an on-chip system, multiple computing devices, combinations thereof, or any other suitable computing device or computing system. Accordingly, FIG. 11 illustrates computing device 1102 as one or more of a tablet, a laptop computer, a smart phone, smart eye glasses, and a camera, though these examples are illustrative and in no way are meant to limit the type or number of devices included in computing device 1102.

The example computing device 1102 includes a processing system 1104, one or more computer-readable media 1106, and one or more I/O interfaces 1108 that are communicatively coupled to each other. Although not shown, computing device 1102 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 1104 is representative of functionality to perform one or more operations using hardware. Accordingly, processing system 1104 is illustrated as including hardware elements 1110 that may be configured as processors, functional blocks, and so forth. This may include implementation in hardware as an application specific integrated circuit or other logic device formed using one or more semiconductors. Hardware elements 1110 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 126 in FIG. 1 are an example of processing system 1104.

Computer-readable storage media 1106 is illustrated as including memory/storage 1112. Storage 128 in FIG. 1 is an example of memory/storage included in memory/storage 1112. Memory/storage component 1112 may include volatile media (such as random access memory (RAM)), nonvolatile media (such as read only memory (ROM), Flash memory, optical disks, magnetic disks, and so forth), or combinations thereof. Memory/storage component 1112 may include fixed media (e.g., RAM, ROM, a fixed hard drive, and so on) as well as removable media (e.g., Flash memory, a removable hard drive, an optical disc, and so forth). Computer-readable media 1106 may be configured in a variety of other ways as further described below.

Input/output interface(s) 1108 are representative of functionality to allow a user to enter commands and information to computing device 1102, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, a touchscreen, and so forth. Thus, computing device 1102 may be configured in a variety of ways as further described below to support user interaction.

Computing device 1102 also includes applications 1114. Applications 1114 are representative of any suitable applications capable of running on computing device 1102, and may include a web browser which is operable to access various kinds of web-based resources (e.g., assets, media clips, images, content, configuration files, services, user profiles, and the like). Applications 1114 include super-resolution application 146, as previously described. Furthermore, applications 1114 includes any applications supporting super-resolution system 112, system 200, system 300, system 400, and super-resolution support system 122.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 1102. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1110 and computer-readable media 1106 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 1110, or combinations thereof. Computing device 1102 may be configured to implement particular instructions and functions corresponding to the software and hardware modules. Accordingly, implementation of a module that is executable by computing device 1102 as software may be achieved at least partially in hardware, e.g., through use of computer-readable storage media and hardware elements 1110 of processing system 1104. The instructions and functions may be executable/operable by one or more articles of manufacture (for example, one or more computing devices 1102 or processing systems 1104) to implement techniques, modules, and examples described herein.

The techniques described herein may be supported by various configurations of computing device 1102 and are not limited to the specific examples of the techniques described herein. This functionality may also be implemented all or in part through use of a distributed system, such as over a "cloud" 1116 via a platform 1118 as described below.

Cloud 1116 includes and is representative of a platform 1118 for resources 1120. Platform 1118 abstracts underlying functionality of hardware (e.g., servers) and software resources of cloud 1116. Resources 1120 may include applications, data, or applications and data that can be utilized while computer processing is executed on servers that are remote from computing device 1102. Resources 1120 can also include services provided over the Internet, through a subscriber network, such as a cellular or Wi-Fi network, or combinations thereof. Resources 1120 can include asset store 1122, which stores assets, such as digital images, photographs (e.g., user images in a gallery, a database of stock photographs, search results including photographs, and the like), reference images, document templates, user profile data, user image libraries, such as photographs posted in a shared photo service, and the like, and may be accessed by computing device 1102.

Platform 1118 may abstract resources and functions to connect computing device 1102 with other computing devices. Platform 1118 may also serve to abstract scaling of resources to provide a corresponding level of scale to encountered demand for resources 1120 that are implemented via platform 1118. Accordingly, in an interconnected device embodiment, implementation of functionality described herein may be distributed throughout system 1100. For example, the functionality may be implemented in part on computing device 1102 as well as via platform 1118 that abstracts the functionality of cloud 1116.

CONCLUSION

In one or more implementations, a digital medium environment includes at least one computing device. Systems, techniques, and devices are described herein for generating a super-resolution image based on reference images. Reference images are not constrained to have same or similar content as a low-resolution image being super-resolved. Texture features indicating high-frequency content are extracted into texture feature maps, and patches of texture feature maps of reference images are determined based on texture feature similarity. A content feature map indicating low-frequency content of an image is adaptively fused with a swapped texture feature map including patches of reference images with a neural network based on similarity of texture features. A user interfaces allows a user to select regions of multiple reference images to use for super-resolution. Hence, a super-resolution image can be generated with rich texture details incorporated from multiple reference images.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to generate super-resolution images, a method implemented by a computing device, the method comprising:

extracting, by the computing device, content features from a low-resolution image into a content feature map;

extracting, by the computing device, first texture features from a scaled version of the low-resolution image into a first texture feature map and second texture features from at least one reference image into a second texture feature map, the first texture feature map and the second texture feature map including first patches and second patches, respectively;

generating, by the computing device, a swapped texture map by replacing each first patch in the first texture feature map with a respective matching second patch from the second texture feature map, the respective matching second patch for each first patch determined from inner product values generated between pairs of each first patch and the second patches, and the respective matching second patch selected from one of the pairs having a largest inner product value; and combining, by the computing device, the content feature map and the swapped texture map according to a respective similarity score between said each first patch and the respective matching second patch to form a super-resolution image.

2. The method as described in claim 1, wherein the content features represent lower frequency content of the low-resolution image than the first texture features.

3. The method as described in claim 1, wherein the scaled version of the low-resolution image is formed by upscaling the low-resolution image to a resolution of the at least one reference image.

4. The method as described in claim 1, wherein the respective similarity score between each first patch and the respective matching second patch is based on the largest inner product value.

5. The method as described in claim 1, wherein the at least one reference image is obtained without constraining the at least one reference image to include same or similar content as the low-resolution image.

6. The method as described in claim 1, wherein the combining includes:

comparing the respective similarity score to a similarity threshold;

accepting the respective matching second patch for inclusion in the combining to form the super-resolution image when the comparing indicates the respective similarity score is greater than the similarity threshold; and rejecting the respective matching second patch for inclusion in the combining to form the super-resolution image when the comparing indicates the respective similarity score is not greater than the similarity threshold.

7. The method as described in claim 1, wherein the combining includes:

multiplying the swapped texture map by a weight map indicating the respective similarity score between said each first patch and the respective matching second patch;

fusing results of the multiplying with the content feature map; and upscaling results of the fusing to form the super-resolution image.

8. The method as described in claim 1, wherein the at least one reference image includes multiple reference images.

9. The method as described in claim 1, wherein the combining is performed with a neural network of the computing device, the neural network trained with low-resolution images obtained by downsampling randomly-cropped patches of a high-resolution image set and reference images obtained from other patches of the high-resolution image set than the randomly-cropped patches.

10. In a digital medium environment to generate super-resolution images, a system comprising:
    a content extractor module implemented at least partially in hardware of a computing device to extract content features from a first image into a content feature map;
    a texture extractor module implemented at least partially in hardware of the computing device to extract first texture features from the first image into a first texture feature map indicating high-frequency content of the first image and second texture features from a region of a reference image into a second texture feature map indicating high-frequency content of the region of the reference image;
    a patch matching module implemented at least partially in hardware of the computing device to determine a respective patch of the second texture feature map for each patch of the first texture feature map;
    a weight map module implemented at least partially in hardware of the computing device to generate a weight map indicating a respective similarity score between the respective patch of the second texture feature map and said each patch of the first texture feature map;
    a texture swapping module implemented at least partially in hardware of the computing device to generate a swapped texture map by replacing said each patch in the first texture feature map with the respective patch from the second texture feature map; and
    a texture transfer module implemented at least partially in hardware of the computing device to combine the content feature map and the swapped texture map according to the weight map to form a super-resolution image, the content feature map and the swapped texture map combined according to the weight map with a neural network trained according to a loss function regularized by texture consistency between the super-resolution image and the reference image.

11. The system as described in claim 10, wherein the region of the reference image is determined from a user selection that indicates to crop the reference image to designate the region of the reference image.

12. The system as described in claim 10, wherein the texture swapping module is further configured to average areas of the swapped texture map overlapped by multiple respective patches from the second texture feature map that are swapped into the swapped texture map.

13. The system as described in claim 10, wherein the patch matching module determines the respective patch of the second texture feature map for each patch of the first texture feature map by convolving the second texture feature map with patches of the second texture feature map.

14. The system as described in claim 10, wherein the first image is an upscaled version of a low-resolution image.

15. In a digital medium environment to generate super-resolution images, a method implemented by a computing device, the method comprising:
    a step for exposing a user interface including a first image and a reference image;
    a step for receiving a user selection via the user interface of a region of the reference image;
    a step for extracting content features from the first image into a content feature map;
    a step for extracting first texture features from the first image into a first texture feature map indicating high-frequency content of the first image;
    a step for extracting second texture features from the region of the reference image into a second texture feature map indicating high-frequency content of the region of the reference image;
    a step for determining, for each first patch of the first texture feature map, a respective matching second patch of the second texture feature map;
    a step for generating a weight map indicating a respective similarity score between said each first patch and the respective matching second patch, the respective similarity score determined from an inner product between each first patch normalized by a norm of each first patch and the respective matching second patch normalized by a norm of the respective matching second patch;
    a step for generating a swapped texture map by replacing said each first patch in the first texture feature map with the respective matching second patch from the second texture feature map; and
    a step for fusing the content feature map and the swapped texture map based on the weight map to form a super-resolution image.

16. The method as described in claim 15, wherein the reference image includes a portion containing random noise without other content.

17. The method as described in claim 15, wherein similarity scores of the weight map are normalized by applying a clamping function to the weight map that limits the similarity scores to be within an interval of scores.

18. The method as described in claim 15, wherein the content features represent lower frequency content of the first image than the first texture features from the first image.

19. The method as described in claim 15, further comprising a step for upscaling the first image to a resolution of the reference image.

20. The method as described in claim 19, wherein the first texture features are extracted from a scaled version of the first image into the first texture feature map.

* * * * *